US008995714B2

(12) United States Patent
Ikeda

(10) Patent No.: US 8,995,714 B2
(45) Date of Patent: Mar. 31, 2015

(54) INFORMATION CREATION DEVICE FOR ESTIMATING OBJECT POSITION AND INFORMATION CREATION METHOD AND PROGRAM FOR ESTIMATING OBJECT POSITION

(75) Inventor: Hiroo Ikeda, Tokyo (JP)

(73) Assignee: NEC Corporation, Tokyo (JP)

( * ) Notice: Subject to any disclaimer, the term of this patent is extended or adjusted under 35 U.S.C. 154(b) by 664 days.

(21) Appl. No.: 13/254,330

(22) PCT Filed: Mar. 4, 2010

(86) PCT No.: PCT/JP2010/053582
§ 371 (c)(1),
(2), (4) Date: Sep. 23, 2011

(87) PCT Pub. No.: WO2010/101227
PCT Pub. Date: Sep. 10, 2010

(65) Prior Publication Data
US 2012/0020523 A1  Jan. 26, 2012

(30) Foreign Application Priority Data
Mar. 4, 2009  (JP) .................. 2009-051173

(51) Int. Cl.
*G06K 9/00* (2006.01)
*G01B 11/00* (2006.01)
*G06T 7/00* (2006.01)

(52) U.S. Cl.
CPC ............ *G01B 11/005* (2013.01); *G06T 7/0046* (2013.01); *G06T 2207/20076* (2013.01)
USPC .......................................... 382/103; 382/154

(58) Field of Classification Search
None
See application file for complete search history.

(56) References Cited

U.S. PATENT DOCUMENTS 6,597,800 B1 * 7/2003 Murray et al. ................ 382/103
7,227,973 B2 * 6/2007 Ishiyama ..................... 382/103
(Continued)

FOREIGN PATENT DOCUMENTS

CN    1685370 A    10/2005
CN    1928896 A    3/2007
(Continued)

OTHER PUBLICATIONS

International Search Report for PCT/JP2010/053582 mailed Apr. 27, 2010.
(Continued)

*Primary Examiner* — Chan Park
*Assistant Examiner* — Mia M Thomas
(74) *Attorney, Agent, or Firm* — Sughrue Mion, PLLC

(57) ABSTRACT

Score determination means 62 determines a score, which indicates how accurately points in real space in respective images respectively acquired by a plurality of image acquisition means represent a target object, for each combination of image acquisition means and point in real space. View status determination means 63 determines the status of view to each point in real space from each image acquisition means by using non-target object presence information indicating to image acquisition means where a non-target object that conceals a target object is present, and determines probability density functions of a score corresponding to the result of the view status determination. Existence probability calculation means 64 determines an existence probability of a target object being present at a point in real space by using probability density functions for each combination of the image acquisition means and point in real space. Estimation information creation means 65 creates information for estimating position from the existence probability.

39 Claims, 21 Drawing Sheets

(56) References Cited

U.S. PATENT DOCUMENTS

| | | | |
|---|---|---|---|
| 7,796,733 B2* | 9/2010 | Hughes | 378/87 |
| 8,108,119 B2* | 1/2012 | Southall et al. | 701/96 |
| 8,866,888 B2* | 10/2014 | Chen et al. | 348/46 |
| 2004/0021664 A1* | 2/2004 | Takemoto et al. | 345/419 |
| 2006/0146049 A1* | 7/2006 | Pulli et al. | 345/421 |
| 2007/0052576 A1* | 3/2007 | Hausner et al. | 342/22 |
| 2008/0284636 A1* | 11/2008 | Hausner et al. | 342/22 |
| 2009/0060272 A1* | 3/2009 | Reinpoldt, III | 382/103 |
| 2010/0073366 A1* | 3/2010 | Tateno | 345/419 |
| 2010/0129001 A1* | 5/2010 | Tsukada | 382/254 |
| 2011/0194732 A1* | 8/2011 | Tsuji | 382/103 |
| 2012/0050258 A1* | 3/2012 | Kay et al. | 345/419 |
| 2012/0194674 A1* | 8/2012 | Reinpoldt et al. | 348/143 |
| 2012/0195465 A1* | 8/2012 | Hughes | 382/103 |
| 2013/0016097 A1* | 1/2013 | Coene et al. | 345/419 |
| 2013/0187905 A1* | 7/2013 | Vaddadi et al. | 345/419 |

FOREIGN PATENT DOCUMENTS

| | | |
|---|---|---|
| CN | 101110908 A | 1/2008 |
| JP | 2004220292 A | 8/2004 |
| JP | 2008015573 A | 1/2008 |
| JP | 2008176504 A | 7/2008 |

OTHER PUBLICATIONS

H. Nakai, "Robust Object Detection using A-Posteriori Probability", Journal of the Information Processing Society of Japan: SIG-CV90-1, Information Processing Society of Japan, 1994, pp. 1-8.

Chinese Office Action for CN201080010636.4 dated on Mar. 7, 2013 with English Translation.

* cited by examiner

INFORMATION CREATION DEVICE FOR ESTIMATING OBJECT POSITION AND INFORMATION CREATION METHOD AND PROGRAM FOR ESTIMATING OBJECT POSITION The present invention relates to an information creation device for estimating object position, an information creation method of estimating object position, and an information creation program for estimating object position, which create information for estimating object position using images respectively obtained by photographing an object from a plurality of directions.

BACKGROUND ART

An image monitoring system for estimating the position of an object is described in Patent Document 1. The system described in Patent Document 1 acquires images from each of a plurality of cameras so that a portion of the fields of the plurality of cameras mutually overlap with respect to a real space (three-dimensional space) in which the position of an object is to be estimated. A moving body region of the target object is then detected using background subtraction processing and frame subtraction processing. Each camera is calibrated in advance for real space. The system described in Patent Document 1 converts moving body regions detected from images of each camera into a planar coordinate system designated within each real space, detects overlapping of moving regions after conversion, and determines the presence of a real body region in real space or estimates the position where it is present.

[Patent Document 1] Japanese Patent Application Laid-open No. 2008-15573 (paragraphs. 0015 to 0046)

In the system described in Patent Document 1, moving body regions detected from images of each camera are converted to a planar coordinate system designated within each real space, and if converted moving body regions overlap with respect to all cameras, an object is estimated to be present at that position. In this system, the range of space in which the position of an object can be estimated is limited to overlapping regions of the fields of all cameras. For example, FIG. 19 indicates an example of a range over which object position can be estimated in a system relating to the present invention. In FIG. 19, the arrows represent the range of the fields of each camera. An overlapping region of the fields of cameras 101 to 103 shown in FIG. 19 is the region indicated with diagonal lines, and in the system described in Patent Document 1, only the position of an object present in this range can be estimated. Furthermore, in FIG. 19, real space is indicated schematically in two dimensions.

A technique has been considered for expanding the region in which position can be estimated in which, in the case moving body regions obtained from two cameras overlap, an object is determined to be present in that overlapping region. FIG. 20 indicates an example of a range over which an object position can be estimated in the case of using this technique. As shown in FIG. 20, the position of an object can be estimated within a range in which the fields of the two cameras overlap, and the range over which object position can be estimated is greater than that of FIG. 19. In this case, however, there are cases in which erroneous detection occurs. FIG. 21 indicates an example of the occurrence of erroneous detection in the case of expanding the range over which object position can be estimated. The case of estimating the positions of three objects 111 to 113 shown in FIG. 21 is used as an example. In addition, the broken line arrows shown in FIG. 21 represent the view volume for the objects. In the example shown in FIG. 21, if the regions of objects obtained from two cameras overlap, an object is determined to be present in that region. Accordingly, the ranges indicated with the bold lines are object detection regions and error occurs in these regions. Although the detection regions can be photographed with a camera other than the two cameras used to detect position in the state of those portions of the detection regions that are to the inside of the objects 111 to 113 in particular (regions indicated with diagonal lines), this ends up resulting in erroneous detection. For example, although the state of a region 115 indicated with diagonal lines can be photographed with the camera 102, the object ends up being determined to be present based on images obtained from the cameras 101 and 103.

As has been described above, when a region where an object position can be estimated is attempted to be expanded, there was the problem of the occurrence of erroneous detection and a decrease in the accuracy of estimation of object position.

In addition, the accuracy of estimation of object position also ends up decreasing if a stationary object is present that conceals a target object for which position is to be estimated. For example, if a stationary object such as a desk, billboard or pillar is present between a target object and a camera, occlusion occurs with respect to the target object and the accuracy at which object position is estimated ends up decreasing. This is because the target object is concealed by the presence of the stationary object, thereby preventing specification of a moving body region of the target object. Since a moving body region is unable to be specified, an erroneous determination is made that a moving body region is not present even though the target object is actually present.

SUMMARY

Therefore, an exemplary object of the present invention is to provide an information creation device for estimating object position, an information creation method of estimating object position, and an information creation program for estimating object position that are able to expand the range over which object position can be estimated while also being able to create information for estimating object position so as to maintain the accuracy of estimating object position. In addition, an exemplary object of the present invention is to create information for estimating object position that enables the position of an object to be estimated even if a stationary object that conceals the object is present.

The information creation device for estimating object position according to an exemplary aspect of the invention is provided with: object region image creation means for creating an object region image that indicates a region representing a target object in an image from each of images respectively acquired by a plurality of image acquisition means;

score determination means for determining a score, which indicates how accurately points in real space in each of the images respectively acquired by the plurality of image acquisition means represent the target object targeted for position estimation, by referencing an object region image for each combination of the image acquisition means and points in real space;

view status determination means for determining status of view to each point in real space from each of the image acquisition means by using non-target object presence information indicating to the image acquisition means where a non-target object that conceals a target object is present, and determining probability density functions of a score in the case of points being a target object and in the case of not being a target object for each combination of image acquisition means and points in real space in accordance with a result of the view status determination;

existence probability calculation means for determining an existence probability of a target object being present at a point in real space by integrating the probability density functions corresponding to the result of determining the status of view to points in real space from the image acquisition means, and estimation information creation means for creating information for position estimation, for each point in a prescribed plane, in order to estimate at what position in the prescribed plane a target object is present, which is known to be arranged at a prescribed height relative to the prescribe plane in real space, based on the existence probability determined for each point in real space by the existence probability means.

In addition, the information creation method of estimating object position according to an exemplary aspect of the invention included: creating an object region image that indicates a region representing a target object in an image from each of the images respectively acquired by a plurality of image acquisition means;

determining a score, which indicates how accurately points in real space in each of the images respectively acquired by the plurality of image acquisition means represent a target object targeted for position estimation, by referencing an object region image for each combination of the image acquisition means and points in real space;

determining status of view to each point in real space from each image acquisition means by using non-target object presence information indicating to the image acquisition means where a non-target object that conceals the target object is present, and determining a probability density function of a score in the case of points being a target object and in the case of not being a target object for each combination of the image acquisition means and points in real space corresponding to a result of the view status determination;

determining an existence probability of a target object being present at a point in real space by integrating the probability density functions corresponding to the result of determining the status of view to a point in real space from an image acquisition means; and creating position estimation information for each point in a prescribed plane in order to estimate at what position in the prescribed plane a target object is present, which is known to be arranged at a prescribed height relative to the prescribe plane in real space, based on the existence probability determined for each point in real space.

In addition the information creation program for estimating object position according to an exemplary aspect of the invention causes a computer to execute: object region image creation processing for creating an object region image that indicates a region representing a target object in an image from each image respectively acquired by a plurality of image acquisition means; score determination processing for determining a score, which indicates how accurately points in real space in each of the images respectively acquired by a plurality of image acquisition means represent a target object targeted for position estimation, by referencing an object region image for each combination of the image acquisition means and points in real space; view status determination processing for determining status of view to each point in real space from each image acquisition means by using non-target object presence information indicating to the image acquisition means where a non-target object that conceals the target object is present, and determining a probability density function of a score in the case of points being a target object and the case of not being a target object for each combination of the image acquisition means and points in real space corresponding to the result of a view status determination; existence probability calculation processing for determining an existence probability of the target object being present at a point in real space by integrating probability density functions corresponding to the result of determining the status of view to a point in real space from the image acquisition means; and estimation information creation processing for creating position estimation information for each point in a prescribed plane in real space in order to estimate at what position in the prescribed plane a target object is present, which is known to be arranged at a prescribed height relative to the prescribe plane, based on the existence probability determined for each point in real space in the existence probability calculation processing.

Information for estimating object position can be created so as to expand the range over which object position can be estimated as well as maintain object position estimation accuracy. In addition, information for estimating object position can be created for carrying out highly accurate position estimation of a target object even if a non-target object is present that conceals the target object.

EXEMPLARY EMBODIMENT

The following provides an explanation of exemplary embodiments of the present invention with reference to the drawings.

First Embodiment

Figure 1:
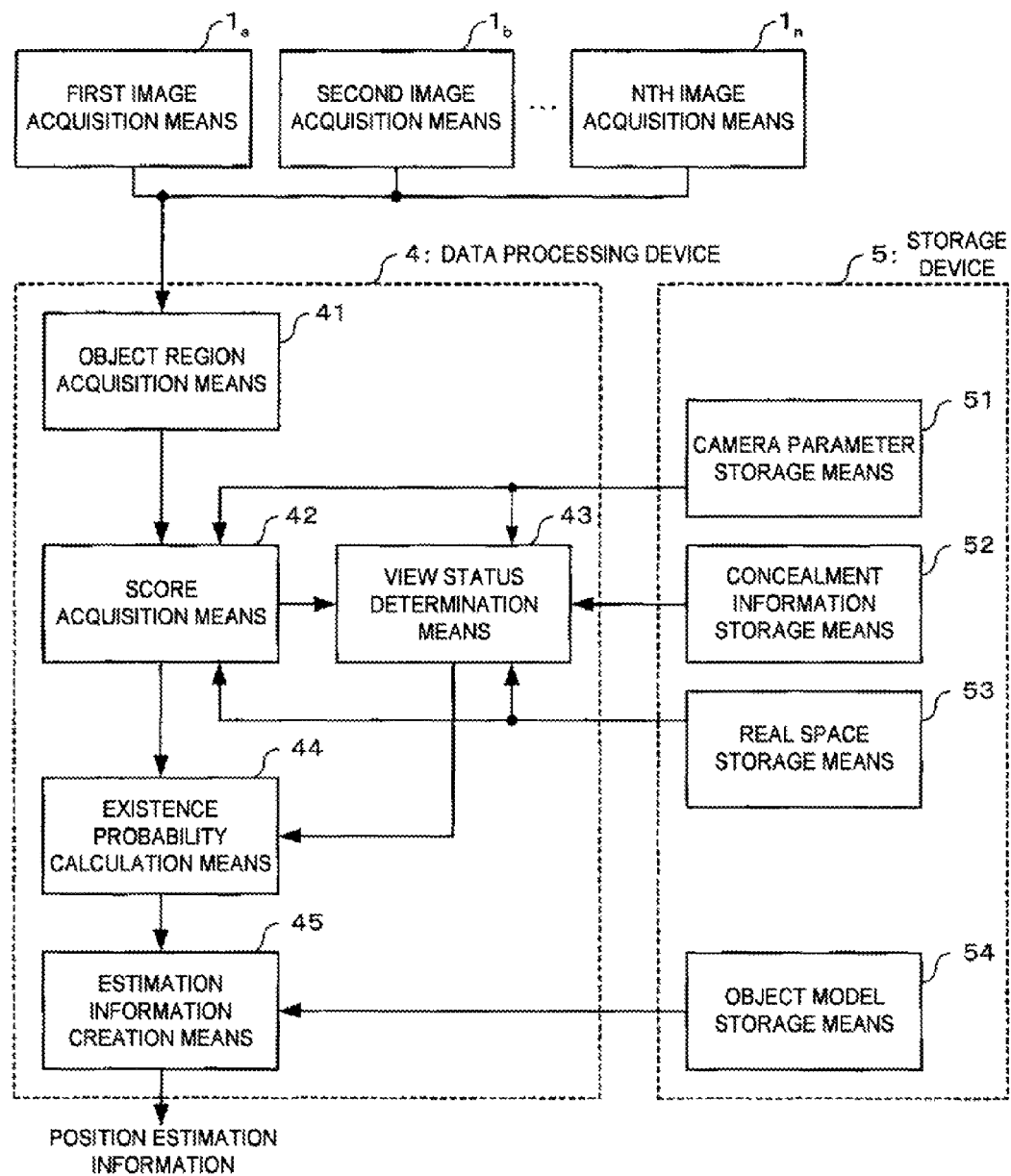
FIG. 1 is a block diagram showing an example of an information creation device for estimating object position of a first embodiment of the present invention.

FIG. 1 is a block diagram showing an example of an information creation device for estimating object position of a first embodiment of the present invention. The information creation device for estimating object position of the first embodiment is provided with 1st to nth image acquisition means 1a to 1n, a data processing device 4, and a storage device 5 that stores information.

Each image acquisition means from 1st image acquisition means 1a to nth image acquisition means 1n acquires an image of three-dimensional space. For example, each image acquisition means 1a to 1n is realized by a camera or video camera that generates an image by capturing three-dimensional space. The captured image may be a still image or video image. In the case of having captured a video image as an image of three-dimensional space, each of the image acquisition means 1a to 1n acquires individual images (frames) of that video image. In addition, each of the image acquisition means 1a to 1n are arranged so as to capture the three-dimensional space from respectively different directions. Furthermore, the image acquisition means 1a to 1n are provided separately from capturing means (camera or video camera) that capture three-dimensional space from different directions, and may be composed to acquire individual images from a video image created by each capturing means. The following explanation uses as an example the case of each of the image acquisition means capturing an image in order to simplify the explanation. Each image acquisition means 1a to 1n acquires simultaneously captured images. Namely, each image acquired by each of the image acquisition means 1a to 1n is synchronized.

The data processing device 4 creates information for estimating the position of a target object (object estimation information) in real space (three-dimensional space) by using images acquired by each of the image acquisition means 1a to 1n. Furthermore, a real object refers to an object for which position is to be estimated.

The storage device 5 includes camera parameter storage means 51, concealment information storage means 52, real space storage means 53 and object model storage means 54.

The camera parameter storage means 51 preliminarily stores camera parameters for carrying out conversion between two-dimensional coordinates of images acquired with the image acquisition means 1a to 1n and three-dimensional coordinates of real space for each of the image acquisition means 1a to 1n. Camera parameters include conversion parameters for converting from three-dimensional coordinates in real space to two-dimensional coordinates in images as well as conversion parameters for converting from two-dimensional coordinates in images to three-dimensional coordinates in real space. These conversion parameters enable mutual conversion between two-dimensional coordinates in images and three-dimensional coordinates of read space. Conversion parameters are calculated in advance by preliminarily correlating two-dimensional coordinates on images with three-dimensional images in real space. In addition, the camera parameter storage means 51 may also include storage of three-dimensional coordinates, image capturing direction and the like of each image acquisition means 1a to 1n.

The concealment information storage means 52 stores presence information of stationary objects that cause occlusion of a target object. In other words, a stationary object that causes occlusion of a target object refers to a stationary object that conceals the target object. Although examples of stationary objects include objects such as a desk, billboard or pillar that conceals the target object, there are no particular limitations on the type of stationary object. In addition, stationary object presence information refers to information that represents where a stationary object is present. In the first embodiment, information indicating a region where a stationary object appears in an image acquired by the image acquisition means 1a to 1n is used as stationary object presence information. More specifically, the concealment information storage means 52 stores a binary image, obtained by designating a region where a stationary object appears in an image as a first pixel value and designating another region in an image as a second pixel value, as stationary object presence information. Each pixel of the binary image corresponds to each pixel of an image acquired by image acquisition means. The binary image used as stationary object presence information is preliminarily created by the data processing device 4 for each image acquisition means and then stored in the concealment information storage means 52.

Figure 2:
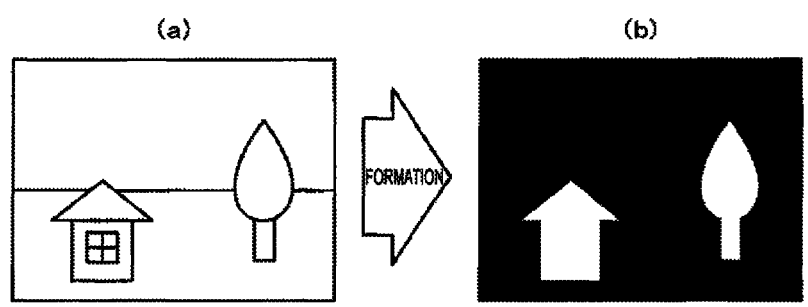
FIG. 2 is an explanatory drawing showing an example of presence information of a stationary object.

FIG. 2 is an explanatory drawing showing an example of stationary object presence information. Certain image acquisition means acquires an image exemplified in FIG. 2A. Binary image generation means (not shown) provided by the data processing device 4 generates a binary image (see FIG. 2B) by defining pixel values of pixels of regions representing stationary objects in the form of a house and tree in the image exemplified in FIG. 2A as "1 (white)" and defining pixel values of other regions as "0 (black)". The binary image shown in FIG. 2B is stored in the concealment information storage means 52 as stationary object presence information corresponding to the image acquisition means that acquired the image exemplified in FIG. 2A. The concealment information storage means 52 stores such binary images for each image acquisition means. In this example, "1" means that a stationary object is present, while "0" means that a stationary object is not present.

In addition, in the case a stationary object moves at a certain time, presence information (binary images) of the stationary object before and after moving is stored in the concealment information storage means 52, and presence images in which the stationary object is present can be referenced corresponding to the time at which an image of a target object is captured. In the subsequent explanations, presence information, in which the presence or absence of a stationary object is represented by a binary image, is referred to as a stationary object binary image.

Figure 3:
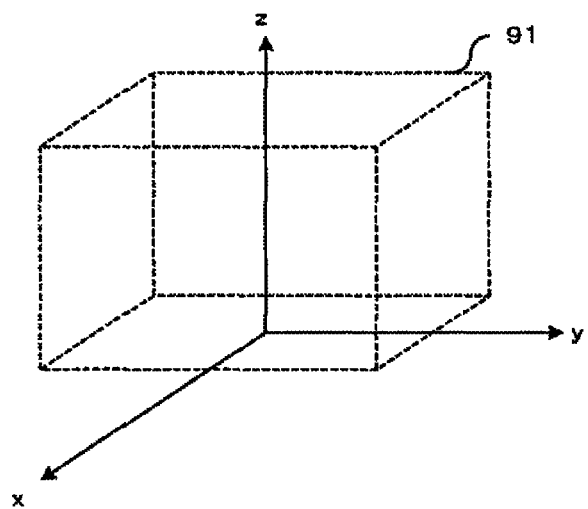
FIG. 3 is an explanatory drawing showing an example of real space in which the position of a target object is estimated.

The real space storage means 53 preliminarily stores the range of real space (three-dimensional space) over which the position of a target object is estimated. FIG. 3 shows an example of real space in which the position of a target object is estimated. In FIG. 3 shows a case in which real space in which the position of a target object is estimated is a rectangular cube 91. The real space storage means 53 may also store the range of an x coordinate, y coordinate and z coordinate of this real space 91, for example. Alternatively, the real space storage means 53 may store the coordinates of each point contained in the real space 91, for example. The plurality of points contained in the real space may be a finite number of discrete points. The real space storage means 53 stores information capable of specifying a finite number of points that define a real space. Furthermore, although the rectangular cube 91 is used as an example in FIG. 3, the range over which position is estimated is not limited to a rectangular cube.

In addition, in the example shown in FIG. 3, the x and y coordinates represent a plane, while the z coordinate represents height from the plane. In the present invention, the shape and size of a target object and the height at which the target object is present are retained as known information, and information is generated for estimating the position of the target object in the xy plane.

Figure 4:
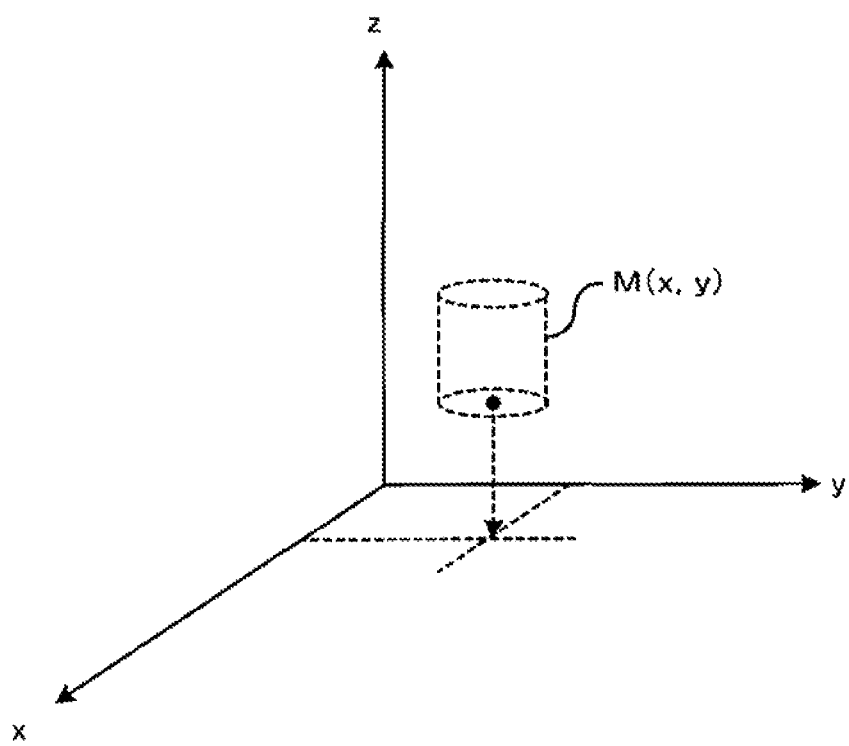
FIG. 4 is an explanatory drawing showing an example of an object model.

The object model information means 54 stores a model that schematically represents the three-dimensional shape and size of a target object. This model is referred to as an object model. The object model is not required to precisely represent the shape and size of a target object, but rather is only required to schematically represent the external form and size of the target object. For example, in the case the target object is a "standing person", the object model storage means 54 may store a circular column as the object model. FIG. 4 is an explanatory drawing showing an example of an object model. The example shown in FIG. 4 uses as an example a case in which a circular column positioned at a prescribed height from the xy plane is used as an object model of a target object. The height of the object model relative to the xy plane is constant. This value may also be zero. For example, in the case of representing an object model of a person standing in an xy plane of a real space, the height of the object model is zero. In addition, in the case of representing an object model of a balloon suspended at a prescribed height from the xy plane, the height of the object model relative to the xy plane is defined by that prescribed height. The position of the object model in the xy plane is not defined.

In addition, although an object model representing a single object is shown in FIG. 4, the object model may be divided.

The data processing device 4 includes object region acquisition means 41, score acquisition means 42, view status determination means 43, existence probability calculation means 44 and estimation information creation means 45.

The object region acquisition means 41 creates an image indicating a region representing an object in an image acquired by each image acquisition means 1a to 1n. This image is referred to as an object region image. Images acquired by each of the 1st to nth image acquisition means are synchronized. The object region acquisition means 41 respectively creates object region images from each image. The object region acquisition means 41 generates object region images using a method such as background subtraction, frame subtraction or a method described in the following reference document.

[Reference Document]

Hiroaki Nakai, "Moving Object Detection Method Using Posterior Probability", Journal of the Information Processing Society of Japan, SIG-CV90-1, Information Processing Society of Japan, 1994

In the case of using background subtraction, background image storage means (not shown) is provided that preliminarily stores, for example, a background image that is an image acquired in the absence of a target object for each image acquisition means. The object region acquisition means 41 then calculates a difference in pixels values of corresponding pixels between the image acquired by the image acquisition means and the background image, and generates a binary image determined by carrying out threshold processing on that difference as an object region image. If an object region image is created in this manner, an image is obtained in which the pixel value of the region that represents the background (namely, that other than the target object) becomes 0 while the pixel value of the region representing the target object becomes 1. In the case of using frame subtraction, the object region acquisition means 41 calculates a difference in pixel values of corresponding pixels between consecutive images (frames) in a video image, and generates a binary image determined by carrying out threshold processing on that difference as an object region image. In this case as well, the object region image can be generated in the same manner as background subtraction.

In addition, in the case the presence of an object in a certain pixel is determined on the basis of probability, the pixel value of that pixel may be defined as a probability value over a range of 0 to 1. For example, the object region acquisition means 41 may generate an image in which the posterior probability of the presence of a target object is used as a pixel value as in the method described in the above-mentioned reference document. In this case, the object region acquisition means 41 determines the posterior probability of the presence of a target object in each pixel, and then uses that posterior probability as a pixel value. Posterior probability is calculated based on images acquired by the image acquisition means.

Here, the object region acquisition means 41 creates an object region image in which the pixel value of each pixel is defined within the range of 0 to 1 (or binary values of 0 and 1) according to background subtraction, frame subtraction or the method described in the above-mentioned reference document. In this case, the score acquisition means 42 defines a score of 0 to 1 as a score to be subsequently described. In addition, the object region image may also be generated by a method other than that described above provided an object region image can be generated in which the pixel value of each pixel is defined within the range of 0 to 1.

The score acquisition means 42 sequentially selects image acquisition means, and converts points (x, y, z) within the range of real space stored in the real space storage means 53 to two-dimensional coordinates corresponding to the selected image acquisition means using camera parameters stored in the camera parameter storage means 51. The score acquisition means 42 specifies a pixel value of a pixel represented by the two-dimensional coordinates from the object region image corresponding to that image acquisition means. Two-dimensional coordinates corresponding to certain image acquisition means refer to two-dimensional coordinates in an image acquired by that image acquisition means.

Image acquisition means selected from each of the image acquisition means 1a to 1n is referred to as "cth image acquisition means" for the sake of convenience. The score acquisition means 42 converts points (x, y, z) in real space to two-dimensional coordinates corresponding to the cth image acquisition means, and specifies a pixel value of the pixel indicated by those two-dimensional coordinates in the object region image calculated for the cth image acquisition means. This pixel value is represented as score $s_{c,x,y,z}$. A score indicates the degree to which the points (x, y, z) in real space accurately represent an object in an image obtained by the cth image acquisition means. The score acquisition means 42 determines scores $s_{c,x,y,z}$ for each combination of the image acquisition means and points in real space.

However, the position indicated by the two-dimensional coordinates may be outside the range of the object region image even if the points in real space have been converted to two-dimensional coordinates corresponding to the image acquisition means. Since each pixel of the object region image corresponds to each pixel of the image acquired by the image acquisition means, if the position indicated by the two-dimensional coordinates after conversion is outside the range of the object region image, this means that the points in real space are not in the field of view when the real space is captured by the image acquisition means. In this case, the score sc,x,y,z is set to a prescribed fixed value indicating that the points in real space are outside the field of view of the image acquisition means. This fixed value is subsequently referred to as an out of range constant.

The view status determination means 43 converts points (x, y, z) within the range of real space stored in the real space storage means 53 to two-dimensional coordinates corresponding to each image acquisition means using camera parameters stored in the camera parameter storage means 15. The view status determination means 43 specifies a pixel value of the pixel indicated by the two-dimensional coordinates from among stationary object binary images (for example, FIG. 2B) corresponding to that image acquisition means.

Moreover, the view status determination means 43 determines the status of view to each point in real space from each image acquisition means based on the pixel value specified from the stationary object binary images and the scores sc,x,y,z determined for each combination of points (x, y, z) in real space and image acquisition means by the score acquisition means 42. The view status determination means 43 defines a probability density function of the score sc,x,y,z for each combination of points in real space and the image acquisition means based on the result of this determination. Two types of probability density functions are defined, consisting of that in the case the points (x, y, z) in real space are a target object and the case in which they are not (in the case of not being a target object). In the following explanations, the category used to distinguish between the case of the points (x, y, z) being a target object and the case in which they are not is represented by ωx,y,z, with ωx,y,z=1 meaning that points in real space represent a target object and ωx,y,z=0 meaning that points in real space do not represent a target object (represent a non-target object). In addition, the probability density function of a score sc,x,y,z in each category is respectively represented by p(sc,x,y,z/ωx,y,z=1) and p(sc,x,y,z/ωx,y,z=0).

Figure 5:
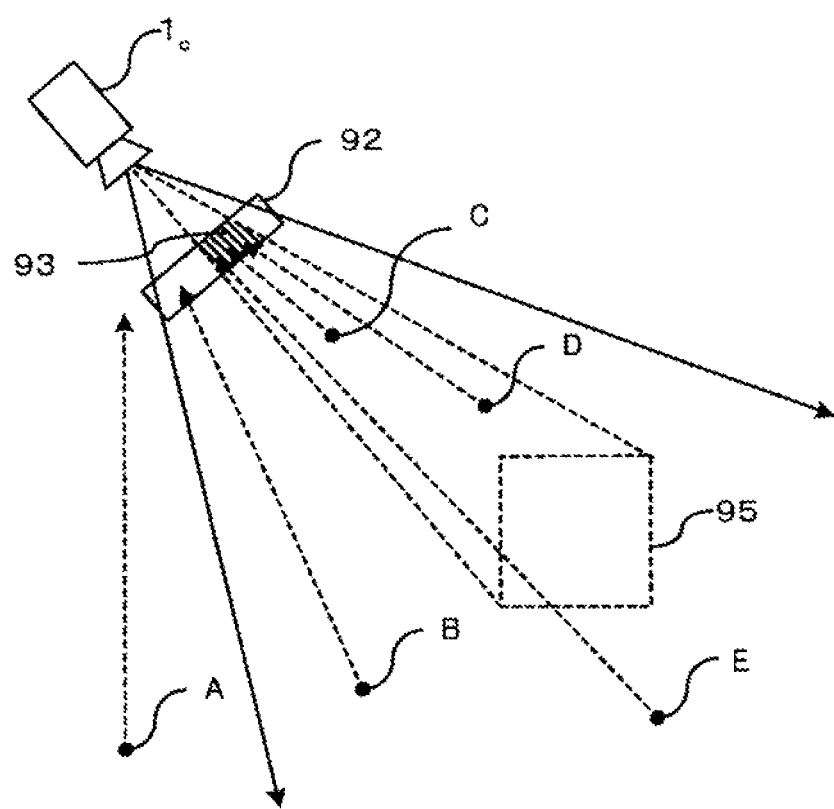
FIG. 5 is an explanatory drawing showing an aspect of defining a probability density function of a score.

FIG. 5 is an explanatory drawing showing an aspect of defining a probability density function of a score. In FIG. 5, three-dimensional real space is represented two-dimensionally. Each point A to E in FIG. 5 is a point in real space, and a stationary object 95 is present in the real space. In addition, a stationary object binary image 92 is indicated schematically in FIG. 5. In FIG. 5, a portion 93 indicated with diagonal lines is a region of the stationary object binary image 92 that represents the stationary object.

When the view status determination means 43 converts the three-dimensional coordinates of point A (see FIG. 5) to two-dimensional coordinates corresponding to image acquisition means 1c, since those two-dimensional coordinates are outside the range of the object region image, the score of point A is defined to be an out of range constant. In the case a score is an out of range constant in this manner, the image acquisition means 1c is in a state in which it is unable to capture (unable to view) the point A. Namely, the point A is outside the field of view of the image acquisition means 1c, the status of view from the image acquisition means 1c to the point A is not satisfactory, and a determination as to whether the point A is an object or non-object cannot be carried out even if a score is used that has been calculated for the combination of the image acquisition means 1c and the point A. In this manner, in the case a score is an out of range constant, the view status determination means 43 determines that the status of view to the point A from the image acquisition means 1c is not satisfactory, and defines a function having a uniform distribution for the probability density function in the case the point A is a target object and in the case it is a non-object.

Figure 6:
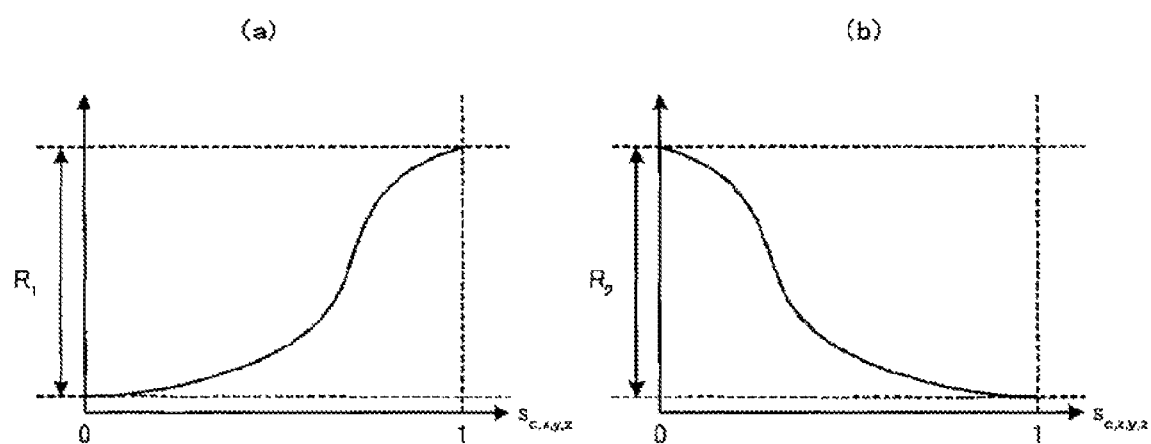
FIG. 6 is an explanatory drawing showing examples of probability density functions.

The view status determination means 43 converts the three-dimensional coordinates of point B (see FIG. 5) to two-dimensional coordinates corresponding to the image acquisition means 1c, and references a pixel of the stationary object binary image 92 indicated by those coordinates. Whereupon, the pixel value indicates that there is no stationary object. In this case, this means that the image acquisition means 1c is able to capture (able to view) the point B. Namely, a stationary object is not present in the direction of view from the image acquisition means 1c to the point B, and the status of view to the point B from the image acquisition means 1c is satisfactory. More specifically, under circumstances such that the image acquisition means 1c is able to view a target object if the target object is present at the point B and unable to view the target object if it is not present at the point B, a score calculated with respect to the combination of the image acquisition means 1c and the point B, namely the score sc,x,y,z determined for the point B, functions effectively. In this manner, in the case the pixel of the stationary object binary image 92 corresponding to coordinates following conversion indicates that a stationary object is not present, the view status determination means 43 determines that the status of view to the point B from the image acquisition means 1c is satisfactory. The view status determination means 43 defines a function in which the probability density function p(sc,x,y,z/ωx,y,z=1) of the score in the case point B is a target object becomes greater the closer the score sc,x,y,z is to 1. In addition, the view status determination means 43 defines a function in which the probability density function p(sc,x,y,z/ωx,y,z=0) of the score in the case point B is not a target object becomes greater the closer the score sc,x,y,z is to 0. Examples of these two types of score probability density functions are shown in FIG. 6. In FIGS. 6A and 6B, scores are plotted on the horizontal axes and probabilities of scores being obtained are plotted on the vertical axes.

FIG. 6A is an example of the score probability density function p(sc,x,y,z/ωx,y,z=1) in the case a target object is present. In the case the target object is present at point (x, y, z), the probability of that score increases as the value of the score approaches 1. Accordingly, the view status determination means 43 defines a probability density function in which the value of p(sc,x,y,z/ωx,y,z=1) increases as the value of sc,x,y,z approaches 1 and the value of p(sc,x,y,z/ωx,y,z=1) decreases as the value of sc,x,y,z approaches 0. In addition, FIG. 6B is an example of the score probability density function p(sc,x,y,z/ωx,y,z=0) in the case a target object is not present. In the case the target object is not present at point (x, y, z), the probability of that score decreases as the value of the score approaches 1. Accordingly, the view status determination means 43 defines a probability density function in which the value of p(sc,x,y,z/ωx,y,z=0) decreases as the value of sc,x,y,z approaches 1 and the value of p(sc,x,y,z/ωx,y,z=0) increases as the value of sc,x,y,z approaches 0. In addition, the view status determination means 43 defines p(sc,x,y,z/ωx,y,z=1), p(sc,x,y,z/ωx,y,z=1) in which the overall integral value of the probability density functions becomes 1. The view status determination means 43 may also estimate this function by learning. In addition, a function that satisfies the above-mentioned conditions based on expertise and experience may also be retained in advance in the view status determination means 43. In addition, in the case of preliminarily retaining the score probability density functions shown in FIG. 6, individual functions may also be retained for each image acquisition means.

The view status determination means 43 converts three-dimensional coordinates of point C (see FIG. 5) to two-dimensional coordinates corresponding to the image acquisition means 1c, and references a pixel of the stationary object binary image 92 indicated by those coordinates. The pixel value indicates that a stationary object is present. In addition, a threshold value th is preliminarily defined for determining whether a target object is present at a point in real space or whether the presence of absence of a target object is unknown at that point. In the case the pixel value of the pixel of the stationary object binary image 92 specified from the point C indicates that a stationary object is present and the score at that point C is equal to or greater than the threshold value th, then the point C is a target object and view status is satisfactory in that the image acquisition means 1c is able to view the target object at the point C. Thus, the score sc,x,y,z determined for the point C functions effectively. In this manner, in the case a stationary object is present and a score is equal to or greater than th, the view status determination means 43 determines that the status of view to the point C from the image acquisition means 1c is satisfactory, and defines the score probability density functions shown in the previously described FIG. 6. Namely, using the score probability density function p(sc,x,y,z/ωx,y,z=1) in the case a target object is present, the view status determination means 43 defines a function in which the function value increases as the score value approaches 1, the function value decreases as the score value approaches 0, and the overall integral value of the probability density functions is 1. Similarly, using the score probability density function p(sc,x,y,z/ωx,y,z=0) in the case a target object is not present, the view status determination means 43 defines a function in which the function value decreases as the score value approaches 1, the function value increases as the score value approaches 0, and the overall integral value of the probability density functions is 1.

With respect to points D and E as well, the view status determination means 43 converts to two-dimensional coordinates corresponding to the image acquisition means 1c and references the pixel of the stationary object binary image 92 indicated by those coordinates. The pixel value indicates that a stationary object is present. In addition, here the scores of points D and E are less than th. In this manner, in the case a stationary object is present and a score is less than th, since the point in real space is positioned in front of a stationary object and that point is not a target object, and since a target object at that point cannot be viewed from the image acquisition means 1c or the point in real space is positioned behind a stationary object when viewed from the image acquisition means 1c, thereby causing the point to be concealed by the object, view status is unclear in that whether or not an object is present at that point cannot be determined. Namely, in the case a stationary object is present and the score is less than th, it is unclear as to whether a target object is at a point in front of the stationary object as with point D or whether a point is concealed by the stationary object as with point E. Thus, the score sc,x,y,z in such a case cannot be used effectively. In this manner, in the case a stationary object is present and the score is equal to or greater than th, the view status determination means 43 determines view status to be unclear, defines a function having a uniform distribution as the score probability density function in the case a point is a target object and in the case a point is not a target object.

In addition, when defining the score probability density function in the case a point is an object and in the case a point is a non-object, the probability density function corresponding to the score value may be determined without comparing the score and threshold value. The following provides an explanation of the case in which the score probability density function is determined without using a threshold value. Here, the view status determination means 43 determines that a stationary object is present. At this time, the view status determination means 43 may determine the probability density function by changing the difference between the function value when the score is 0 and the function value when the score is 1 (to be referred to as the range of variation) corresponding to the score value. R1 and R2 in FIG. 6 indicates ranges of variation. The view status determination means 43 determines a probability density function having a large range of variation for the probability density function the larger the score value determined by the score acquisition means 42, and determines a probability density function having a small range of variation for the probability density function the smaller the score value.

More specifically, the view status determination means 43 determines a function for the score probability density function in the case a point is an object in which the function value increases as the score value approaches 1, the function value decreases as the score value approaches 0, and the overall integral value of the probability density functions is 1 (see FIG. 6A). However, the view status determination means 43 determines a probability density function having a large range of variation R1 the larger the score value determined by the score acquisition means 42, and determines a probability density function having a small range of variation R1 the smaller the score value. Similarly, the view status determination means 43 determines a function for the score probability density function in the case a point is not an object in which the function value decreases as the score value approaches 1, the function value increases as the score value approaches 0, and the overall integral value of the probability density functions is 1 (see FIG. 6B). However, the view status determination means 43 determines a probability density function having a large range of variation R2 the larger the score value determined by the score acquisition means 42, and determines a probability having small range of variation R2 the smaller the score value. Probability density functions of each range of variation corresponding to score values may be preliminarily retained in the view status determination means 43, and a probability density function corresponding to a score value may be selected from among the probability density functions retained by the view status determination means 43. Alternatively, a probability density function corresponding to a score value may also be determined by learning.

Furthermore, there are no particular limitations on the range of variation of a probability density function when the view status determination means 43 has determined that there are no stationary objects. A probability density function estimated by learning may be used as previously explained, or a preliminarily defined probability density function may be used.

As a result of determining the probability density function of a score by continuously changing a range of variation corresponding to the score value in this manner, information can be created for accurately estimating position. In addition, the threshold value th can be omitted from parameters used to determine probability density function.

Determination of the probability density function of a score corresponding to the result of determination of view status in the case a point is a target object and in the case it is a non-object means that, if the view from the image acquisition means 1c to a point in real space can be reliably secured, the score is dependable and is actively used, if the view cannot be reliably secured, the score is not used, and if a stationary object is present, the score is either used corresponding to the value of the score or the score is not actively used. Determination of whether a point in real space that does not use a score is an object or non-object is carried out based on information obtained from other image acquisition means.

The existence probability calculation means 44 calculates the posterior probability of the presence of a target object at (x,y,z) and the posterior probability of the absence of a target object at (x, y, z) using the score sc,x,y,z obtained from the score acquisition means 42 and the score probability density functions $p(sc,x,y,z/\omega x,y,z=1)$, $p(sc,x,y,z/\omega x,y,z=0)$ in the cases of object/non-object obtained from the view status determination means 43 for each point (x,y,z) within the range of the real space stored in the real space storage means 53. More specifically, posterior probability is determined by carrying out the calculations indicated in the following formula (1).

$$P(\omega_{x,y,z} \mid s_{1,x,y,z}, \ldots, s_{n,x,y,z}) = \frac{\left\{\prod_{c=1}^{n} p(s_{c,x,y,z} \mid \omega_{x,y,z})\right\} P(\omega_{x,y,z})}{p(s_{1,x,y,z}, \ldots, s_{n,x,y,z})}$$

$$= \frac{\left\{\prod_{c=1}^{n} p(s_{c,x,y,z} \mid \omega_{x,y,z})\right\} P(\omega_{x,y,z})}{\sum_{\omega_{x,y,z}=0}^{1} \left[\left\{\prod_{c=1}^{n} p(s_{c,x,y,z} \mid \omega_{x,y,z})\right\} P(\omega_{x,y,z})\right]} \quad (1)$$

According to formula (1), status regarding the presence of a target object at point (x,y,z) can be ascertained by determining posterior probability $P(\omega x,y,z/s1,x,y,z, \ldots sn,x,y,z)$.

In formula (1), $P(\omega x,y,z)$ is the prior probability of the presence of a target object or the prior probability of the absence of a target object, and may have a value of 0.5. Alternatively, the value of $P(\omega x,y,z)$ may also be set on the basis of expertise. In addition, $p(s1,x,y,z, \ldots sn,x,y,z)$ indicated in formula (1) is the joint probability of scores obtained for each of the image acquisition means 1a to 1n, and is independent of the object/non-object category.

In the case of calculating the posterior probability of the presence of a target object at (x,y,z), the existence probability calculation means 44 uses $p(sc,x,y,z/\omega x,y,z=1)$ for the term $p(sc,x,y,z/\omega x,y,z)$ in the denominator of formula (1). In addition, in the case of calculating the posterior probability of the absence of a target object at (x,y,z), the existence probability calculation means 44 uses $p(sc,x,y,z/\omega x,y,z=0)$ for the term $(p(sc,x,y,z)/\omega x,y,z)$ in the denominator of formula (1).

The estimation information creation means 45 determines object information V(x,y,z) indicating whether or not a target object is present at a point (x,y,z) in real space for each point from the posterior probability determined by calculation of formula (1) by the existence probability calculation means 44. If V(x,y,z)=1, this means that a target object is present at (x,y,z), while if V(x,y,z)=0, this means that a target object is not present at (x,y,z). The estimation information creation means 45 compares the posterior probability of the presence of a target object at (x,y,z) with the posterior probability of the absence of a target object. If the posterior probability of the presence of a target object is larger, the estimation information creation means 45 determines that a target object is present at point (x,y,z) and determines that V(x,y,z)=1. In addition, if the two posterior probabilities are equal or the posterior probability of the absence of a target object is greater, the estimation information creation means 45 determines that a target object is not present at point (x,y,z), and determines that V(x,y,z)=0.

In addition, in the case the number of probability density functions among the n number of probability density functions corresponding to each of the image acquisition means 1a to 1n of the case the field is unable to be reliably secured (probability density functions having a uniform distribution) is equal to or greater than a fixed number, whether or not an object is present at a point in real space may be treated as being unable to be accurately determined, and V(x,y,z) may be treated as being equal to 0.

The estimation information creation means 45 respectively selects coordinates (x,y) of each point in the xy plane of real space, and allocates an object model at the selected position. Namely, when an object model is allocated to the selected position, the space occupied by the object model is specified. When (x,y) has been selected, the space occupied by the object model is defined as M(x,y). When the estimation information creation means 45 has selected an allocation position (x,y) for the object model, it elects object information V(x,y,z) of a point belonging to the space M(x,y) occupied by the object model. This election consists of adding values corresponding to each point in space in a certain space, and in this case, adds the value of V(x,y,z). The result of this election (namely, the result of addition) is expressed as v(x,y). The election result in the form of v(x,y) serves as position estimation information, and the estimation information creation means 45 calculates the position estimation information v(x, y) for each point in the xy plane of real space.

The estimation information creation means 45 carries out election by carrying out the calculation indicated in the following formula (2).

$$v(x,y) = \Sigma_{x',y',z' \in M(x,y)} V(x',y',z') \quad (2)$$

In formula (2), (x',y',z') indicates the coordinates of each point belonging to the space M(x,y) occupied by the object model.

In addition, the posterior probability $p(\omega x,y,z=1/sc,x,y,z)$ calculated by the existence probability calculation means 44 indicates the probability of an object being present at a point in real space. Accordingly, in the case of carrying out election, the posterior probability of the presence of a target object may be elected instead of the object information V(x,y,z). In this case, the estimation information creation means 45 carries out election by carrying out the calculation indicated in the following formula (3).

$$v(x,y) = \Sigma_{x',y',z' \in M(x,y)} P(\omega_{x',y',z'} = 1 \mid s_{1,x',y',z'}, \ldots, s_{n,x',y',z'}) \quad (3)$$

As has been described above, (x',y',z') indicates the coordinates of each point belonging to the space M(x,y) occupied by the object model.

Where a target object is present in the xy plane of real space can be estimated from v(x,y) determined for each point in the xy plane. For example, object position can be estimated by carrying out, for example, threshold processing, labeling or calculation of center of gravity on v(x,y) determined for each position.

Next, an explanation is provided of operation.

Figure 7:
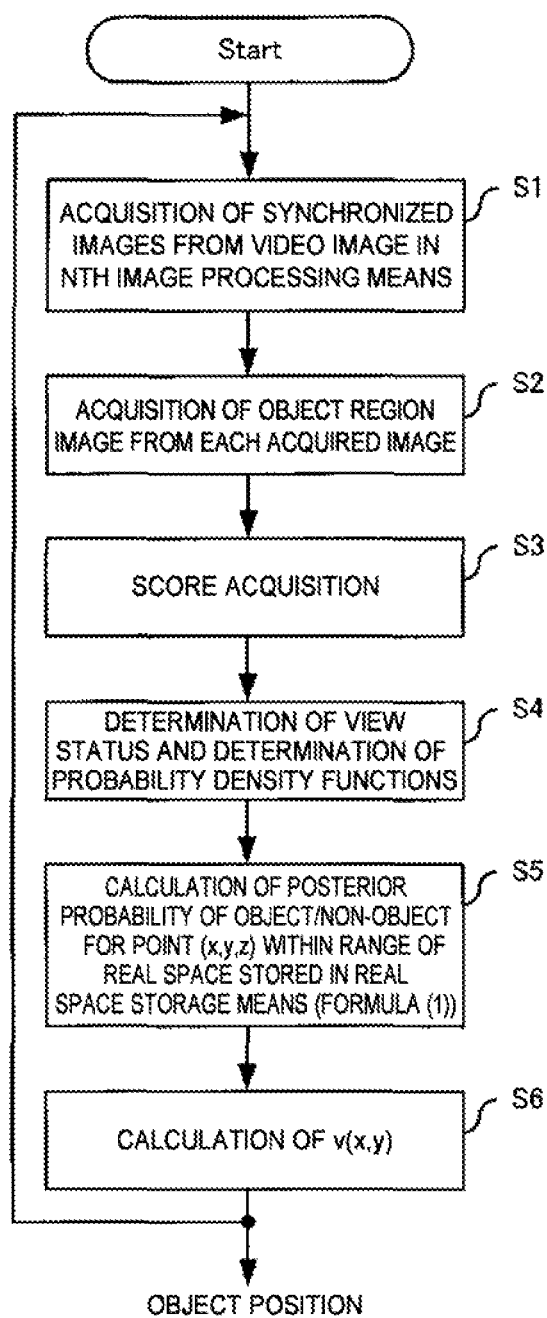
FIG. 7 is a flow chart showing an example of the course of processing of the present invention.

FIG. 7 is a flow chart showing an example of the course of processing of the present invention. Each of the image acquisition means from the 1st image acquisition means 1a to the nth image acquisition means 1n captures a video image of real space from respectively different directions to acquire individual images from the video image. The images acquired by each of the image acquisition means 1a to 1n are images captured at the same point in time. Namely, the images are synchronized. The object region acquisition means 41 then acquires each synchronized image from each of the image acquisition means 1a to 1n (Step S1). For example, images from each of the image acquisition means 1a to 1n are input to the object region acquisition means 41. Next, the object region acquisition means 41 creates object region images from the images acquired from each of the image acquisition means 1a to 1n (Step S2). As was previously explained, the object region acquisition means 41 creates the object region images by, for example, background subtraction, frame subtraction or the method described in the above-mentioned reference document. Alternatively, object region images may also be created using other methods.

Figure 8:
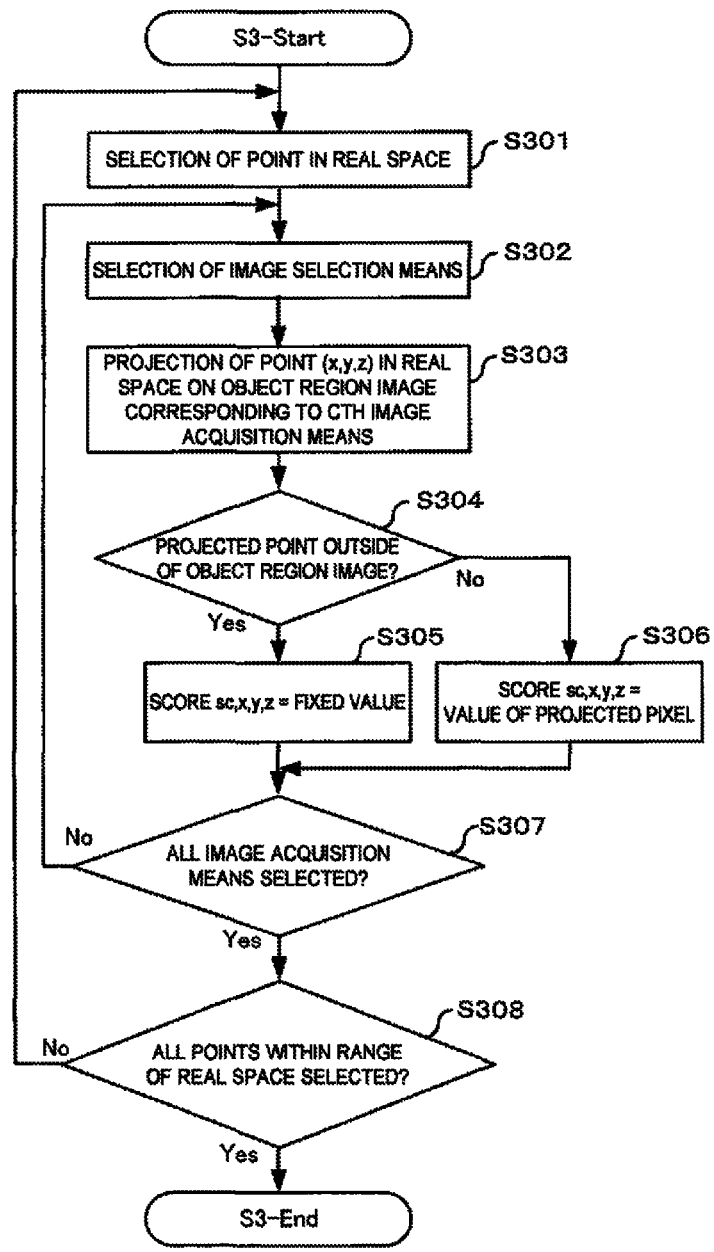
FIG. 8 is a flow chart showing an example of the course of processing of a step S3.

Next, the score acquisition means 42 determines a score $sc,x,y,z$ for each combination of the image acquisition means and point in real space (Step S3). FIG. 8 is a flow chart indicating an example of the course of processing of Step S3. The following provides an explanation of Step S3 with reference to FIG. 8.

In Step S3, the score acquisition means 42 selects one point from the range of real space stored in the real space storage means 53 (Step S301). The selected point is defined as (x,y,z). Moreover, the score calculation means 42 selects one image acquisition means from among each of the 1st to nth image acquisition means 1a to 1n (Step S302). Here, the selected image acquisition means is the cth image acquisition means.

Next, the score acquisition means 42 converts the selected point (x,y,z) to two-dimensional coordinates corresponding to the cth image acquisition means (namely, two-dimensional coordinates in the image acquired by the cth image acquisition means) using camera parameters of the cth image acquisition means among the camera parameters stored in the camera parameter storage means 51 (Step S303). This processing can be said to be processing in which the selected point (x,y,z) is projected onto the object region image corresponding to the cth image acquisition means.

Next, the score acquisition means 42 determines whether or not the point of the two-dimensional coordinates converted from point (x,y,z) in Step S303 is outside the range of the object region image (Step S304). If the point of the two-dimensional coordinates converted from point (x,y,z) is outside the range of the object region image (Yes in Step S304), the score acquisition means 42 treats the value of the score $sc,x,y,z$ relating to the pair consisting of the selected point (x,y,z) and the cth image acquisition means as being an out of range constant (Step S305). In addition, if the point of the two-dimensional coordinates converted from point (x,y,z) is within the range of the object region image (No in Step S304), the score acquisition means 42 defines the pixel values of pixels within the object region image indicated by the two-dimensional coordinates as the score $sc,x,y,z$ (Step S306).

Following completion of Step 305 or Step 306, the score acquisition means 42 determines whether or not all image acquisition means have been selected (Step S307). If there are image acquisition means remaining that have not been selected (No in Step S307), the score acquisition means 42 newly selects image acquisition means and repeats the processing starting in Step S302. As a result of this loop processing, scores are determined for each combination of selected point (x,y,z) and each image acquisition means.

In the case all image acquisition means have been selected (Yes in Step S307), the score acquisition means 42 determines whether or not all points within the range of the real space stored in the real space storage means 53 have been selected (Step S308). If there are points remaining that have not been selected (No in Step S308), the score acquisition means 42 newly selects a point in real space and repeats the processing starting in Step S301. As a result of this loop processing, a score is determined for each combination of the point in real space and the image acquisition means. Step S3 (score acquisition processing) ends once all points in real space have been selected (Yes in Step S308).

Figure 9:
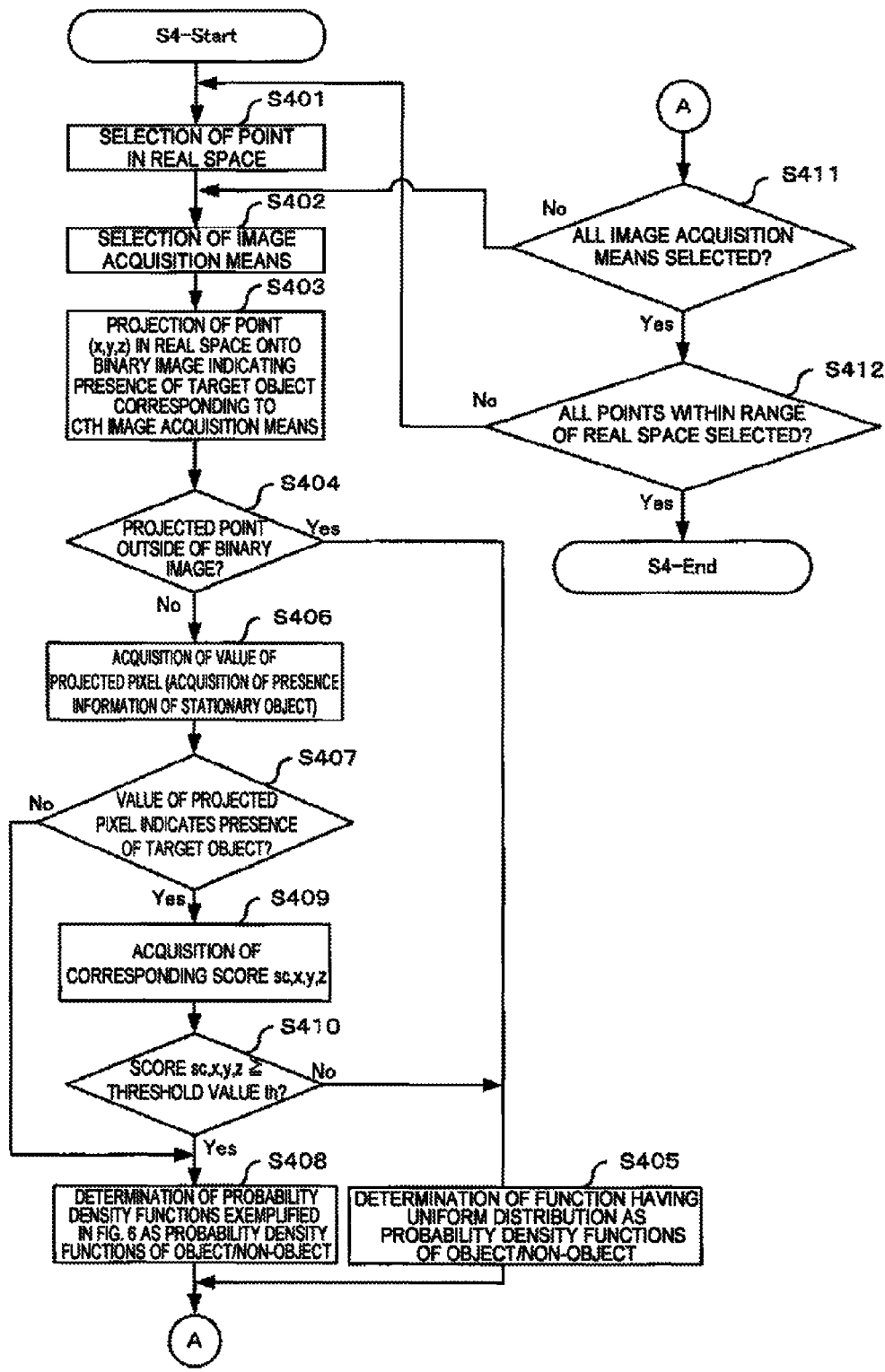
FIG. 9 is a flow chart showing an example of the course of processing of a step S4.

Following completion of Step S3 (see FIG. 7), the view status determination means 43 determines the status of view to each point in real space from each of the image acquisition means 1a to 1n, and on the basis of the result of that determination, determines score probability density functions corresponding to a combination of the point in real space and the image acquisition means (Step S4). At this time, the score probability density function $p(sc,x,y,z/\omega x,y,z=1)$ in the case a target object is present at the position of a point in real space and the probability density function $p(sc,x,y,z/\omega x,y,z=0)$ in the case a target object is not present are determined for the score probability density functions. FIG. 9 is a flow chart showing an example of the course of processing of Step S4. The following provides an explanation of Step S4 with reference to FIG. 9.

In Step S4, the view status determination means 43 selects one point from within the range of the real space stored in the real space storage means 53 (Step S401). The selected point is defined as (x,y,z). Moreover, the view status determination means 43 selects one image acquisition means from among each of the 1st to nth image acquisition means 1a to 1n (Step S402). Here, the selected image acquisition means is the cth image acquisition means.

Next, the view status determination means 43 converts the selected point (x,y,z) to two-dimensional coordinates corresponding to the cth image acquisition means using camera parameters corresponding to the cth image acquisition means among the camera parameters stored in the camera parameter storage means 51 (Step S403). A stationary object binary image corresponding to the cth image acquisition means is also in accordance with this two-dimensional coordinate system. Accordingly, this processing can be said to be processing in which the selected point (x,y,z) is projected onto a stationary object binary image corresponding to the cth image acquisition means.

Next, the view status determination means 43 determines whether or not the point of the two-dimensional coordinates converted from the point (x,y,z) in Step S403 is outside the range of the stationary object binary image corresponding to the cth image acquisition means (Step S404). If the point of the two-dimensional coordinates converted from the point (x,y,z) is outside the range of the stationary object binary image (Yes in Step S404), the view status determination means 43 defines a function having a uniform distribution as the score probability density function in the case in which the selected point is a target object and in the case it is not a target object (Step S405).

In addition, if the point of the two-dimensional coordinates converted from the point (x,y,z) is within the range of the stationary object binary image (No in Step S404), the view status determination means 43 reads the pixel values of pixels of the stationary object binary image indicated by the two-dimensional coordinates converted from the point (x,y,z) from the concealment information storage means 52, and determines whether or not the pixels values are values indicating the presence of a stationary object (Step S407).

If the pixel values of pixels of the stationary object binary image are values indicating that a stationary object is not present (No in Step S407), the view status determination means 43 defines the score probability density functions respectively exemplified in FIGS. 6A and 6B as score probability density functions in the case the selected point is a target object and in the case it is not a target object (Step S408). In Step S408, the view status determination means 43 defines a function for the score probability density function p(sc,x,y,z/ωx,y,z=1) of the case in which the selected point is a target object in which the function value increases as the score value approaches 1, the function value decreases as the score value approaches 0, and the overall integral value of the probability density functions is 1. In addition, the view status determination means 43 defines a function for the score probability density function p(sc,x,y,z/ωx,y,z=0) in the case the selected point is not a target object in which the function value decreases as the score value approaches 1, the function value increases as the score value approaches 0, and the overall integral value of the probability density functions is 1.

In addition, if pixel values of pixels of the stationary object binary image are values indicating that a stationary object is present as a result of the determination of Step S407 (Yes in Step S407), the score sc,x,y,z corresponding to the combination of the selected point (x,y,z) and the cth image acquisition means is acquired (Step S409). For example, each score may be retained by the score acquisition means 42 in Step S3, and the view status determination means 43 may be read the score sc,x,y,z corresponding to the selected point and image acquisition means. Continuing, the view status determination means 43 determines whether the acquired score sc,x,y,z is equal to or greater than the threshold value th (Step S410).

If the score sc,x,y,z is equal to or greater than the threshold value th as a result of the determination of Step S410 (Yes in Step S410), the view status determination means 43 respectively defines the score probability density functions exemplified in FIGS. 6A and 6B as score probability density functions in the case the selected point is a target object and in the case the selected point is not a target object (Step S408). In addition, if the score sc,x,y,z is less than the threshold value th (No in Step S410), the view status determination means 43 defines a function having a uniform distribution as the score probability density function in the case the selected point is a target object and in the case the selected point is not a target object (Step S405).

Following completion of Step S405 or Step S408, the view status determination means 43 determines whether or not all image acquisition means have been selected (Step S411). If there are image acquisition means remaining that have not been selected (No in Step S411), the view status determination means 43 newly selects image acquisition means and repeats the processing starting in Step S402. As a result of this loop processing, score probability density functions are determined for each combination of selected point (x,y,z) and each image acquisition means.

In the case all image acquisition means have been selected (Yes in Step S411), the view status determination means 43 determines whether or not all points within the range of the real space stored in the real space storage means 53 have been selected (Step S412). If there are points remaining that have not been selected (No in Step S412), the view status determination means 43 newly selects a point in real space and repeats the processing starting in Step S401. As a result of this loop processing, a score probability density function is determined for each combination of the point in real space and the image acquisition means. Step S4 ends once all points in real space have been selected (Yes in Step S412).

Following completion of Step S4 (see FIG. 7), the existence probability calculation means 44 calculates the posterior probability of a target object being present at (x,y,z) and the posterior probability of a target object not being present at (x,y,z) for each point within the range of the real space stored in the real space storage means 53 using the score sc,x,y,z defined by the score acquisition means 42 and the score probability density functions p(sc,x,y,z/ωx,y,z=1) and p(sc, x,y,z/ωx,y,z=0) defined by the view status determination means 43 (Step S5).

Figure 10:
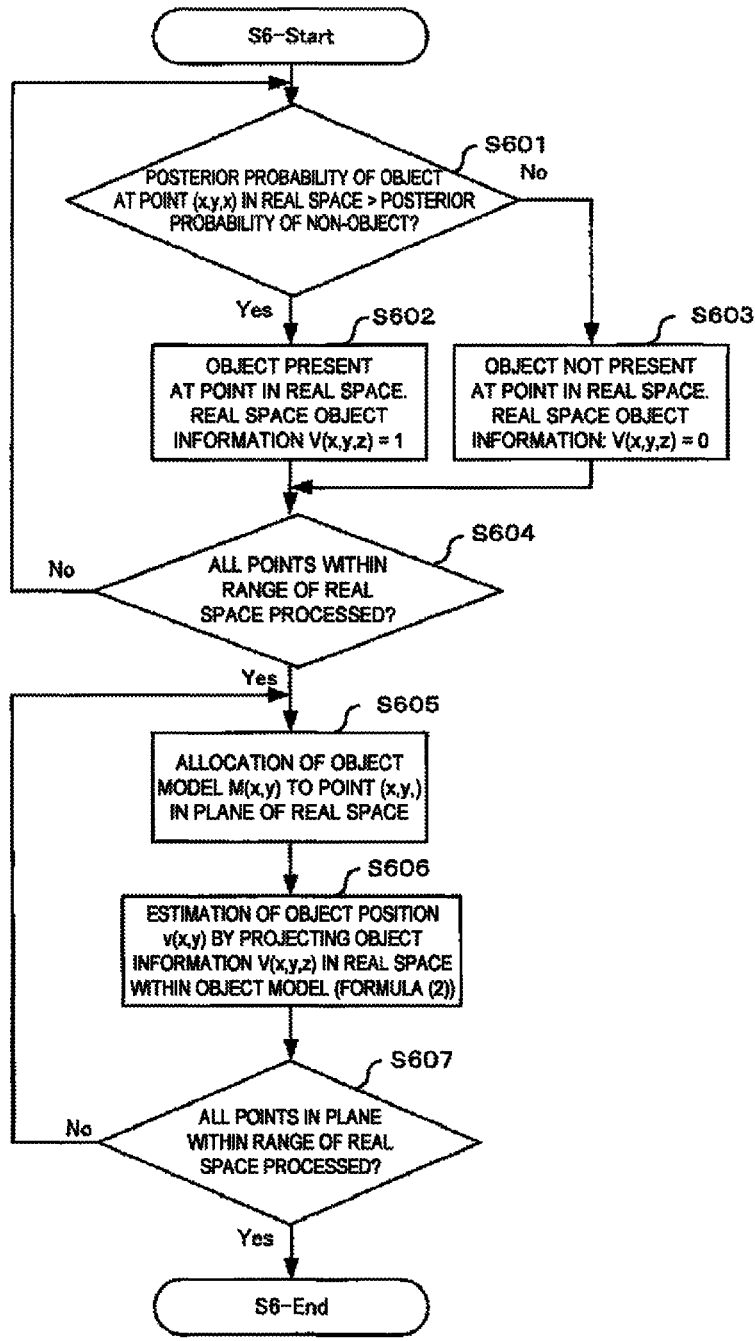
FIG. 10 is a flow chart showing an example of the course of processing of a step S6.

Next, the estimation information creation means 45 selects coordinates (x,y) for each point in the xy plane of the real space. The estimation information creation means 45 then calculates position estimation information v(x,y) by allocating an object model to the selected position and electing object information in space M(x,y) occupied by the object model (Step S6). FIG. 10 is a flow chart showing an example of the course of processing of Step S6. The following provides an explanation of Step S6 with reference to FIG. 10.

The estimation information creation means 45 selects one point (x,y,z) from within the range of the real space stored in the real space storage means 53, compares the posterior probability of a target object being present and the posterior probability of a target object not being present at that point, and determines whether or not the posterior probability of a target object being present is greater than the posterior probability of a target object not being present (Step S601).

If the posterior probability of a target object being present is greater than the posterior probability of a target object not being present (Yes in Step S601), the estimation information creation means 45 determines that a target object is present at the selected point, and sets the value of the object information V(x,y,z) at the selected point to 1 (Step S602). In addition, if the posterior probability of a target object being present is equal to or less than the posterior probability of a target object not being present (No in Step S601), the estimation information creation means 45 determines that a target object is not present at the selected point, and sets the value of the object information V(x,y,z) of the selected point to 0 (Step S603).

Following completion of Step S602 or Step S603, the estimation information creation means 45 determines whether or not object information V(x,y,z) has been determined for all points within the range of the real space stored in the real space storage means 53 (Step S604). If there are points for which V(x,y,z) has not been determined (No in Step S604), the estimation information creation means 45 selects an unselected point and repeats the processing starting in Step S601.

If V(x,y,z) has been determined for all points (Yes in Step S604), the estimation information creation means 45 selects one point from the xy plane of the real space and allocates an object model to that position (Step S605). Namely, the space M(x,y) occupied by the object model is specified when an object model has been allocated to the position of a selected point.

Next, the estimation information creation means 45 calculates position estimation information v(x,y) at the selected position in the xy plane by electing the object information V(x,y,z) of each point belonging to the space M(x,y) occupied by the object model (Step S606). In this example, v(x,y) is calculated by carrying out the calculation of formula (2).

Next, the estimation information creation means 45 determines whether or not v(x,y) has been calculated for all points in the xy plane in real space (Step S607). If there are points for which v(x,y) has not been calculated (No in Step S607), the estimation information creation means 45 selects an unselected point from the xy plane and repeats the processing starting from Step S605. In addition, if there are no points for which v(x,y) has not been calculated (Yes in Step S607), the processing of Step S6 (see FIG. 7) ends.

According to Step S6, position estimation information v(x, y) is obtained for each point in the xy plane of real space. Since the value of v(x,y) increases the closer to the position where a target object is present, the position where a target object is present can be estimated from the v(x,y) of each point.

In addition, although the flow chart shown in FIG. 10 indicates the case in which position estimation information v(x,y) is calculated by electing object information V(x,y,z), the estimation information creation means 45 may also calculate position estimation information v(x,y) by electing a posterior probability of the presence of a target object that has been calculated in Step S5.

The information creation device for estimating object position of the present embodiment projects points in real space onto an object region image corresponding to the image acquisition means or a stationary object binary image representing the presence of a stationary object that conceals a target object. The status of view to the point in real space from the image acquisition means is then determined using information obtained by that projection. In the case a view can be reliably secured, information of the object region image is actively used to determine an existence probability of an object at the point in real space and calculate position estimation information. As a result of being configured in this manner, position estimation information can be created with only information from image acquisition means able to secure a view without having to use information from all image acquisition means, and that position estimation information can be used to estimate position. In addition, since position can be estimated using position estimation information v(x,y) created by the information creation device for estimating object position of the present invention, the position of an object can be estimated not only in a region where all fields of the image acquisition means overlap, but even in regions where only a portion of the fields of the image acquisition means overlap, thereby making it possible to expand the range over which position can be estimated. In addition, by projecting onto a stationary object binary image representing the presence of a stationary object that conceals a target object, view status can be determined by using information obtained from that projection, thereby enabling the stable creation of position estimation information even if a stationary object is present that conceals a target object.

In addition, in the present invention, in addition to a binary value corresponding to the presence or absence of an object, an intermediate value corresponding to the probability of the presence of an object can be treated as a pixel value of each pixel of an object region image determined in Step S2. Consequently, it is not necessary to determine pixel values of the object region image for any of the binary values corresponding to the presence or absence of an object in the early stage of processing (Step S2), but rather a presence probability can be determined using a large amount of information consisting of object region images corresponding to each image acquisition means when determining the presence probability of an object in real space, thereby making it possible to create highly accurate position estimation information.

Second Embodiment

Figure 11:
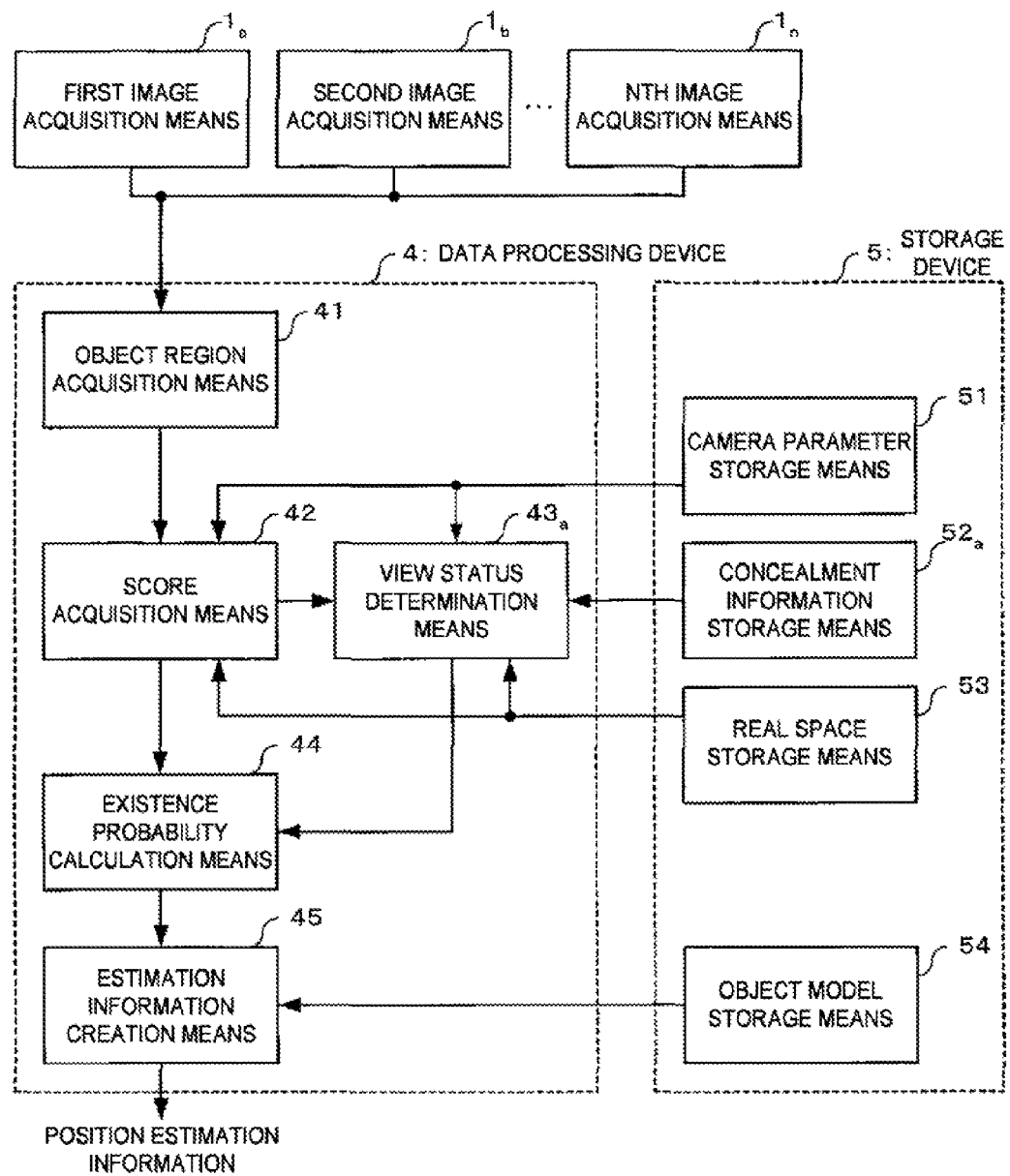
FIG. 11 is a block diagram showing an information creation device for estimating object position of a second embodiment of the present invention.

FIG. 11 is a block diagram showing an example of an information creation device for estimating object position of a second embodiment of the present invention. The same reference symbols are used to indicate those constituents of the second embodiment that are similar to those of the first embodiment, and explanations thereof are omitted. The information creation device for estimating object position of the second embodiment is provided with 1st to nth image acquisition means 1a to 1n, the data processing device 4 and the storage device 5 that stores information.

The storage device 5 includes the camera parameter storage means 51, concealment information storage means 52a, the real space storage means 53 and the object model storage means 54. The camera parameter storage means 51, the real space storage means 53 and the object model storage means 54 are the same as in the first embodiment. Furthermore, in the present embodiment, the camera parameter storage means 51 stores information such as the three-dimensional positions and image capturing direction of each of the image acquisition means 1a to 1n in real space.

The concealment information storage means 52a stores presence information of stationary objects that cause occlusion of a target object. In the present embodiment, the concealment information storage means 52a preliminarily stores the presence information of stationary objects as information of a three-dimensional region occupied by a stationary object in real space (three-dimensional shapes and positions of stationary objects). In the case a stationary object moves at a certain time, the three-dimensional shape and position of the stationary object before and after moving are stored in the concealment information storage means 52a, and the three-dimensional shape and position of the stationary object can be referenced corresponding to the time at which an image of a target object is captured.

The three-dimensional shape and position of a stationary object may also be determined by generating a stationary object binary image exemplified in FIG. 2B from images acquired by each of the 1st to nth image acquisition means, for example, and calculating the three-dimensional shape and position of the stationary object from the intersections of the view volumes of each binary image. The three-dimensional shape and position of the stationary object may also be stored in the concealment information storage means 52a.

The data processing device 2 includes the object region acquisition means 41, the score acquisition means 42, view status determination means 43a, the existence probability calculation means 44 and the estimation information creation means 45. The object region acquisition means 41, the score acquisition means 42, the existence probability calculation means 44 and the estimation information creation means 45 are the same as in the first embodiment.

In the present embodiment, the view status determination means 43a determines whether or not a stationary object represented by information stored in the concealment information storage means 52a is present between each point (x,y,z) within the range of real space and each of the image acquisition means 1a to 1n.

The view status determination means 43a calculates three-dimensional coordinates in real space using conversion parameters for converting from two-dimensional coordinates in an image acquired by selected image acquisition means to three-dimensional coordinates in real space. When carrying out this calculation, the view status determination means 43a is able to calculate three-dimensional coordinates in real space having a z coordinate by designating the z coordinate in real space. The view status determination means 43a calculates each coordinate value from the position of the presence of the image acquisition means to a selected point by designating z coordinates in order starting from the z coordinate of the position of the presence of the image acquisition means in real space to the z coordinate of the selected point. The view status determination means 43a then determines whether or not a coordinate corresponding to the inside of a stationary object is present among each of the coordinates.

In addition, the view status determination means 43a acquires information indicating whether or not the position indicated by two-dimensional coordinates is within an object region image when a selected point has been converted to two-dimensional coordinates corresponding to image acquisition means. The view status determination means 43a acquires a score, for example, for use as this information. If the score value is an out of range constant, the position of the two-dimensional coordinates after conversion is determined to be outside the object region image, while if the score value is not an out of range constant, the position of the two-dimensional coordinates after conversion is judged to be within the object region image.

In addition, the view status determination means 43a determines the status of view to a point in real space from image acquisition means by using the result of determining whether or not the position of two-dimensional coordinates obtained by converting a selected point to two-dimensional coordinates corresponding to image acquisition means is within an object region image and the result of determining whether or not a stationary object is present between image acquisition means and the selected point. Moreover, the view status determination means 43a defines probability density functions of the score sc,x,y,z for each combination of the point in real space and the image acquisition means based on the results of this determination. In the present embodiment as well, the view status determination means 43a defines the score probability density function $p(sc,x,y,z/\omega x,y,z=1)$ in the case a point (x,y,z) in real space is a target object and the score probability density function $p(sc,x,y,z/\omega x,y,z=0)$ in the case the point (x,y,z) in real space is not a target object (non-object).

Figure 12:
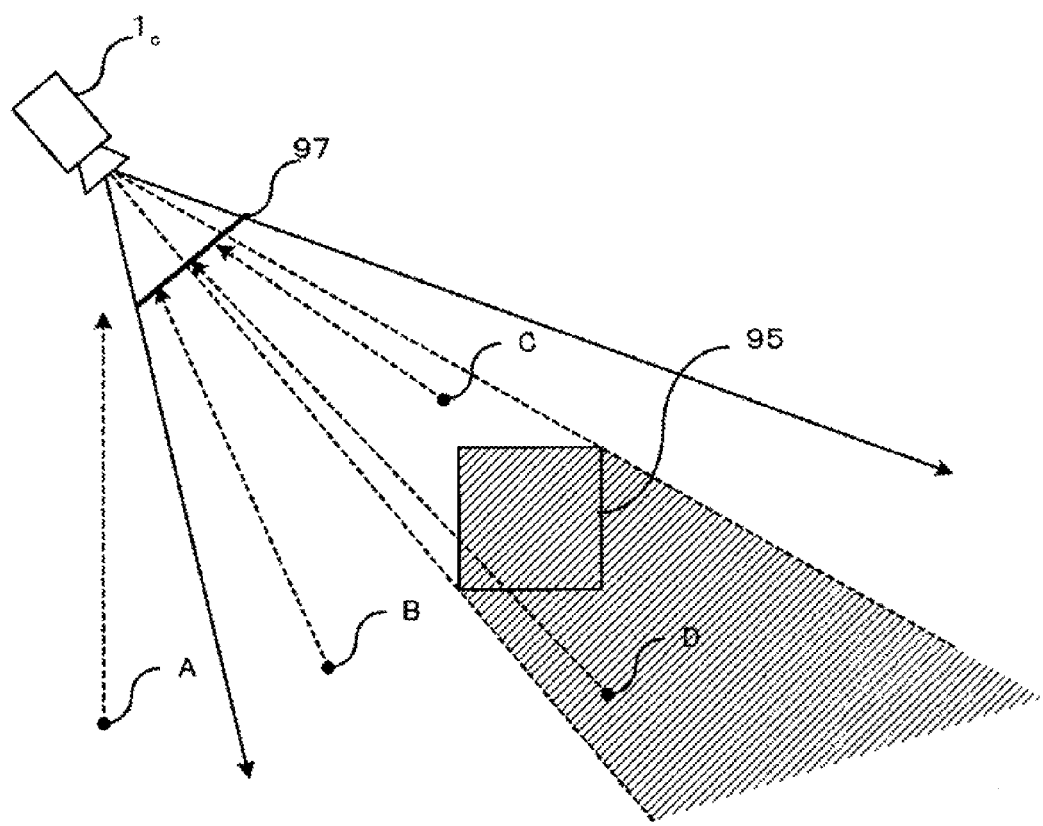
FIG. 12 is an explanatory drawing showing an aspect of defining score probability density functions in a second embodiment.

FIG. 12 is an explanatory drawing indicating an aspect of defining score probability density functions in the second embodiment. In FIG. 12, three-dimensional space is represented two-dimensionally. Each point A to D in FIG. 12 is a point in real space, and the stationary object 95 is present in the real space. In addition, an object region image 97 is indicated schematically in FIG. 12. The range indicated with diagonal lines in FIG. 12 is a range in which the image acquisition means 1c is unable to capture an image as a result of the image being concealed by the stationary object 95.

In the case of having converted three-dimensional coordinates of point A (see FIG. 12) to two-dimensional coordinates corresponding to the image acquisition means 1c, the two-dimensional coordinates are outside the range of the object region image. In this case, the view status determination means 43a determines that the point A cannot be captured (cannot be viewed) from the image acquisition means 1c. Namely, the view status is determined to not be satisfactory. In this case, since whether the point A is an object or non-object cannot be determined even if the score sc,x,y,z is used, the view status determination means 43a defines a function having a constant distribution for the score probability density function in the case the point A is a target object and in the case it is a non-object.

In the case of having converted three-dimensional coordinates of points B and C (see FIG. 12) to two-dimensional coordinates corresponding the image acquisition means 1c, the two-dimensional coordinates are within the range of the object region image. In addition, the view status determination means 43a determines that a stationary object is not present between points B and C and the image acquisition means 1c. In this manner, in the case two-dimensional coordinates are within the range of an object region image, and a stationary object is not present between a point and the image acquisition means 1c, the view status determination means 43a determines that the point can be captured (can be viewed) from the image acquisition means 1c. Namely, the view status is determined to be satisfactory. In this case, the score sc,x,y,z determined for point B functions effectively. At this time, the view status determination means 43a defines a function for the probability density function $p(sc,x,y,z/\omega x,y,z=1)$ of the score in the case the point is a target object in which the function value increases as the score sc,x,y,z approaches 1 and the function value decreases as the score sc,x,y,z approaches 0. In addition, the view status determination means 43a defines a function for the probability density function $p(sc,x,y,z/\omega x,y,z=0)$ of the score in the case the point is not a target object in which the function value decreases as the score sc,x,y,z approaches 1 and increases as the score sc,x,y,z approaches 0. In addition, the view status determination means 43a defines a function for $p(sc,x,y,z/\omega x,y,z=1)$, $p(sc,x,y,z/\omega x,y,z=1)$ in which the overall integral value of the probability density functions becomes 1. Similar to the first embodiment, the view status determination means 43a may also estimate these functions by learning. Alternatively, these functions may also be retained in advance. In addition, the score probability density functions may be modified correspondingly to the situation of each image acquisition means.

In the case of having converted three-dimensional coordinates of point D (see FIG. 12) to two-dimensional coordinates corresponding to the image acquisition means 1c, the two-dimensional coordinates are within the range of the object region image. In addition, the view status determination means 43a determines that a stationary object is present between the point D and the image acquisition means 1c. In this manner, in the case two-dimensional coordinates are within the range of an object region image and a stationary object is present between a point and the image acquisition means 1c, the view status determination means 43a determines that the point cannot be captured (cannot be viewed) from the image acquisition means 1c. Namely, the view status is determined to not be satisfactory. In this case, since it cannot be determined whether the point D is an object or non-object even if the score sc,x,y,z is used, the view status determination means 43a defines a function having a uniform distribution for the score probability density functions in the case the point is a target object and in the case the point is a non-object.

In the present embodiment as well, determination of score probability density functions in the case a point is an object and in the case a point is a non-object corresponding to the result of determination of view status means that, if the view from the image acquisition means 1c to a point in real space can be reliably secured, the score is dependable and is actively used, and in the case a view cannot be secured, determination of whether a point is an object or non-object is carried out based on information obtained from other image acquisition means.

Next, an explanation is provided of operation of the present embodiment.

The information creation device for estimating object position of the present embodiment also carries out the processing of Steps S1 to S6 shown in FIG. 7. However, the course of processing of Step S4 differs from that of the first embodiment. Since the operation of Steps S1 to S3 and Steps S5 and S6 is the same as in the first embodiment, explanations thereof are omitted.

Figure 13:
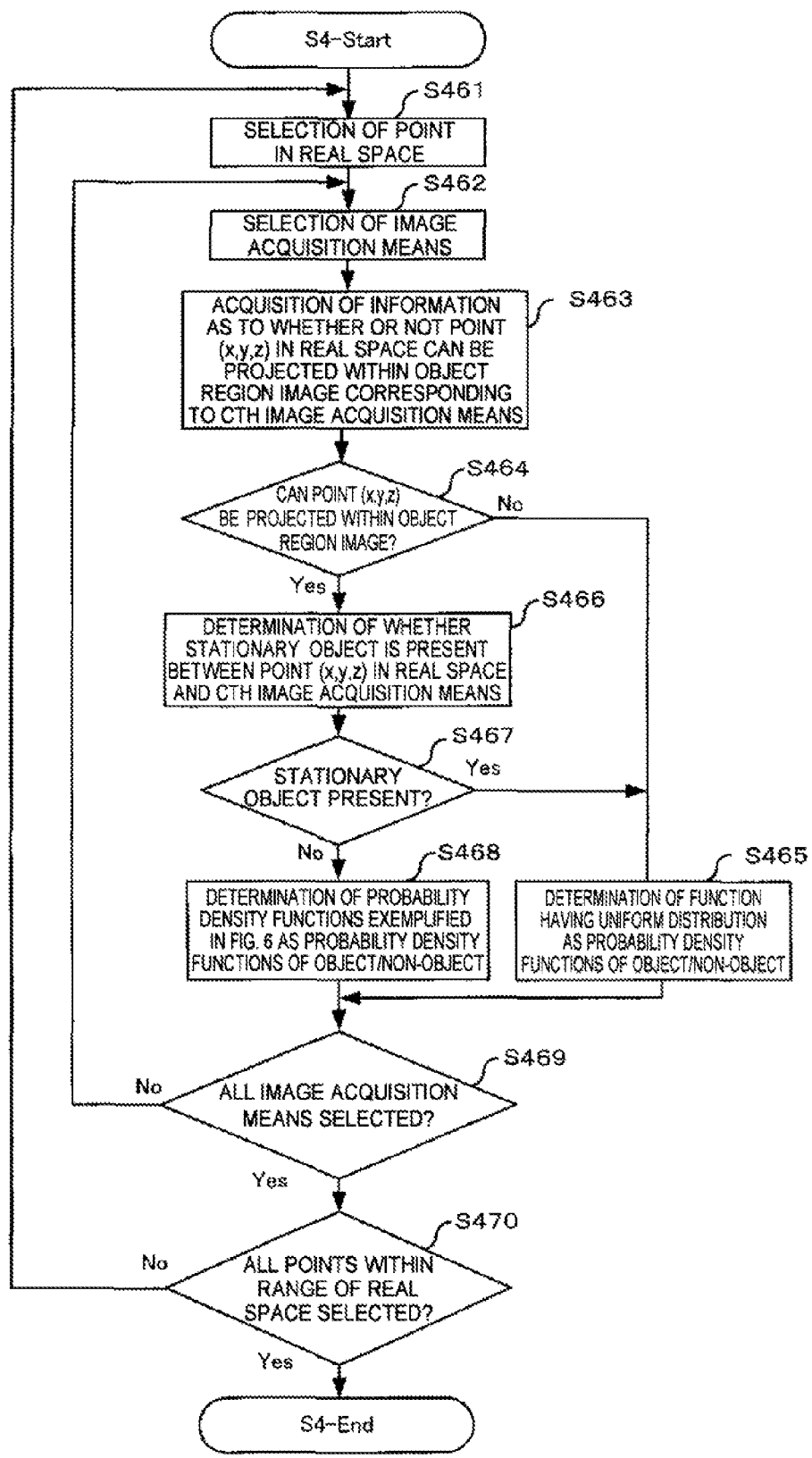
FIG. 13 is a flow chart showing an example of the course of processing of a step S4 in a second embodiment.

The following provides an explanation of processing for determining score probability density functions by determining view status (Step S4) in the second embodiment. FIG. 13 is a flow chart showing an example of the course of processing of Step S4 in the second embodiment.

In Step S4, the view status determination means 43a selects one point from within the range of real space stored in the real space storage means 53 (Step S461). The selected point is defined as (x,y,z). Next, the view status determination means 43a selects one image acquisition means from among each of the 1st to nth image acquisition means 1a to 1n (Step S462). Here, the selected image acquisition means is the cth image acquisition means.

Next, the view status determination means 43a acquires from the score acquisition means 42 information indicating whether or not the selected point (x,y,z) within the range of real space can be projected within an object region image (Step S463). This information indicates whether or not a position indicated by two-dimensional coordinates is within the object region image when the selected point is converted to two-dimensional coordinates corresponding to the cth image acquisition means, and the view status determination means 43a acquires a score, for example, for use as this information.

Continuing, the view status determination means 43a determines whether or not a position indicated by two-dimensional coordinates is within the object region image when the selected point is converted to two-dimensional coordinates corresponding to the cth image acquisition means by referencing the information acquired in Step S463 (Step S464).

If the two-dimensional coordinates obtained by converting coordinates of the selected point are determined to be outside the object region image (No in Step S464), the view status determination means 43a defines a function having a uniform distribution as a score probability density function in the case the point is a target object and in the case it is not a target object (Step S465).

If the two-dimensional coordinates obtained by converting coordinates of the selected point are determined to be within the object region image (Yes in Step S464), the view status determination means 43a determines whether or not a stationary object is present between the selected point in real space (x,y,z) and the cth image acquisition means using camera parameters stored in the camera parameter storage means 51 (Step S466). In Step S466, the view status determination means 43a converts from two-dimensional coordinates in an image acquired by the selected image acquisition means to coordinates in three-dimensional space by designating a z coordinate in real space. At this time, the view status determination means 43a designates z coordinates in order from the cth image acquisition means to the selected point (x,y,z), and determined whether or not that point is within a stationary object by determining a point in real space having the designated z coordinate.

The view status acquisition means 43a determines whether or not a stationary object is present between the selected point in real space (x,y,z) and the cth image acquisition means (Step S466), and defines a function having a uniform distribution for the score probability density function in the case a stationary object has been determined to be present between the selected point and the cth image acquisition means (Yes in Step S467), in the case the selected point is a target object, and in the case the selected point is not a target object (Step S465).

In addition, in the case a stationary object is determined to not be present (No in Step S467), the view status determination means 43a respectively defines the score probability density functions exemplified in FIGS. 6A and 6B as score probability density functions in the case the selected point is a target object and in the case the selected point is not a target object (Step S468). In Step S468, the view status determination means 43a defines a function for the score probability density function $p(sc,x,y,z/\omega x,y,z=1)$ in the case the selected point is a target object in which the function value increases as the score approaches 1, the function value decreases as the score approaches 0, and the overall integral value of the probability density functions is 1. In addition, the view status determination means 43a defines a function for the score probability density function $p(sc,x,y,z/\omega x,y,z=0)$ in the case the selected point is not a target object in which the function value decreases as the score sc,x,y,z approaches 1, increases as the score sc,x,y,z approaches 0, and the overall integral value of the probability density functions is 1.

Following completion of Step S468 or Step S465, the view status determination means 43a determines whether all image acquisition means have been selected (Step S469). If there are image acquisition means remaining that have not been selected (No in Step S469), the view status determination means 43a newly selects image acquisition means and repeats the processing starting in Step S462. As a result of this loop processing, score probability density functions are determined for each combination of selected point (x,y,z) and each image acquisition means.

In the case all image acquisition means have been selected (Yes in Step S469), the view status determination means 43a determines whether or not all points within the range of the real space stored in the real space storage means 53 have been selected (Step S470). If there are points remaining that have not been selected (No in Step S470), the view status determination means 43a newly selects a point in real space and repeats the processing starting in Step S461. As a result of this loop processing, score probability density functions are determined for each combination of each point in real space and each image acquisition means. Step S4 ends once all points in real space have been selected (Yes in Step S470).

According to the present embodiment, the concealment information storage means 52a stores the position and shape of a stationary object in real space, and the view status determination means 43a determines whether or not a stationary object is present between image acquisition means and a point within the range of the real space. The estimation information creation means 45 then calculates position estimation information based on score probability density functions defined corresponding to the result of that determination. In the present embodiment, since a determination is made as to whether or not a stationary object is present between image acquisition means and a point within the range of real space, view status can be reliably ascertained in a view volume portion created by the stationary image causing concealment, and the accuracy of estimating object position can be improved. For example, a target object is assumed to not be present at the position of point C in FIG. 12. In this case, in the first embodiment, it is not possible to distinguish between a target object not being present and a target object being concealed by a stationary object, and small scores obtained from the object region image were unable to be used. In the second embodiment, view status is satisfactory if a stationary object is not present between image acquisition means and a point within the range of real space, thereby enabling even small scores to be used effectively. Accordingly, in the case of using position estimation information determined in the second embodiment, the position of a target object can be estimated with higher accuracy.

Figure 14:
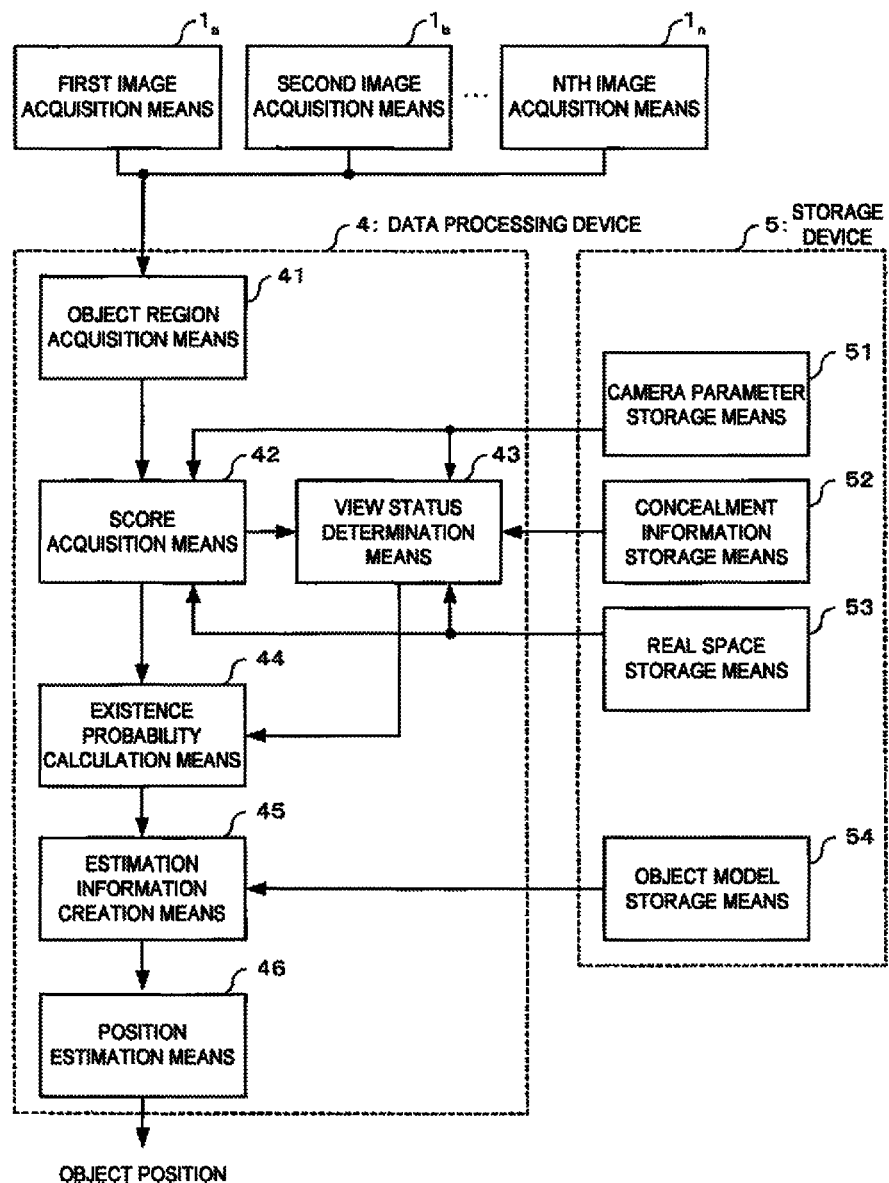
FIG. 14 is a block diagram showing a configuration example in the case of estimating the position of a target object.

Next, an explanation is provided of a variation of the previously described first and second embodiments. The data processing device 4 may also carry out processing for estimating the position of a target object using position estimation information v(x,y). FIG. 14 is a block diagram showing a configuration example in the case of estimating the position of a target object using v(x,y). The same reference symbols are used to indicate those constituents that are the same as those of the first embodiment, and explanations thereof are omitted. In the present example, the data processing device 4 further includes position estimation means 46 in addition to the object region acquisition means 41, the score acquisition means 42, the view status determination means 43, the existence probability calculation means 44 an the estimation information creation means 45.

The position estimation means 46 estimates at what position a target object is present in an xy plane based on the position estimation information v(x,y) calculated for each point in the xy plane of real space. Namely, the position estimation means 46 estimates x,y coordinates of a position where a target object is present.

The estimation information creation means 45 allocates an object model to each point in the xy plane, and calculates v(x,y) for each point by electing a posterior probability of the presence of object information V(x,y,z) or an object in real space occupied by the object model. Thus, the value of v(x,y) increases as the coordinates (x,y) approach the position where the object is present.

Thus, the position estimation means 46 estimates the position of a target object based on the size of the value of v(x,y). For example, the position estimation means 46 may specify coordinates (x,y) for which v(x,y) reaches a maximum, and then estimate that a target object is present at that position.

Figure 15:
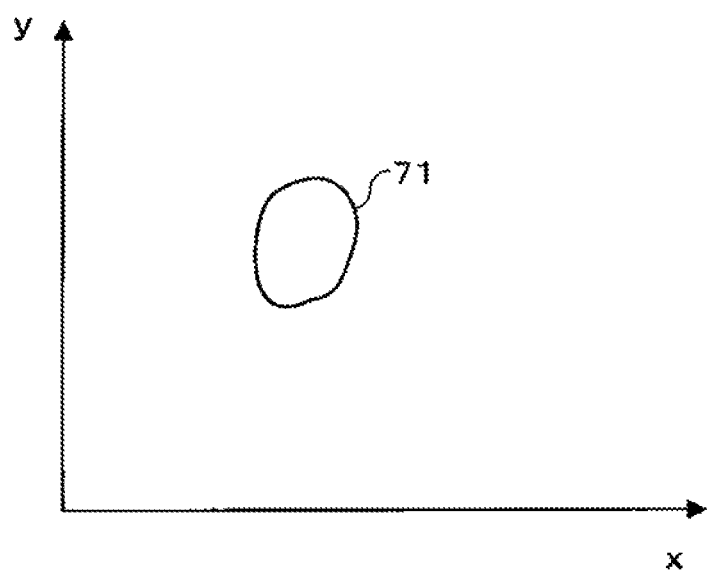
FIG. 15 is an explanatory drawing showing an example of a range defined by labeling.

Alternatively, the position of a target object may be estimated in the manner described below. The position estimation means 46 carries out labeling based on a range over which the value of v(x,y) is equal to or greater than a predetermined threshold value. Labeling refers to identifying a range corresponding to a single target object. The position estimation means 46 estimates a target object to be present at a center of gravity position of a range for each range defined by labeling. For example, the position estimation means 46 specifies a range 71 exemplified in FIG. 15 by labeling based on a range over which the value of v(x,y) is equal to or greater than a threshold value. In this case, the position estimation means 46 calculates the center of gravity position of the range 71 and determines that a target object is estimated to be present at that position.

Figure 16:
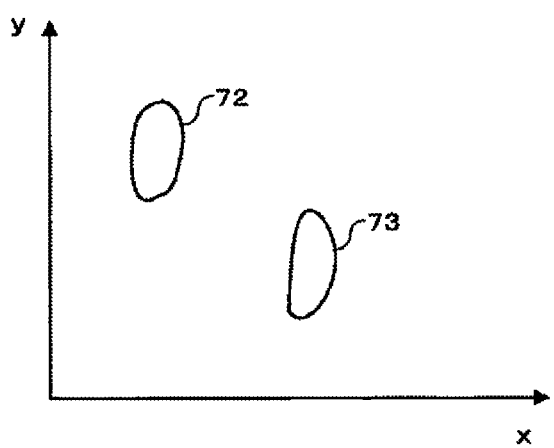
FIG. 16 is an explanatory drawing showing an example of a case in which a plurality of ranges defined by labeling are present.

The range identified by labeling is not limited to a single range, but rather a plurality of ranges 72 and 73 may be defined as exemplified in FIG. 16. In this case, the position estimation means 46 separately calculates center of gravity for each of the ranges 72 and 73 defined by labeling, and estimates a plurality of positions where a target object is present.

As a result of being provided with the position estimation means 46, at what position a target object is present can be specifically estimated after having calculated the position estimation information v(x,y). Accordingly, the present configuration example can also be referred to as an object position estimation device. Furthermore, although FIG. 14 shows a configuration in which the position estimation means 46 has been added to the first embodiment, a configuration may also be employed in which the position estimation means 46 is added to the second embodiment.

Figure 17:
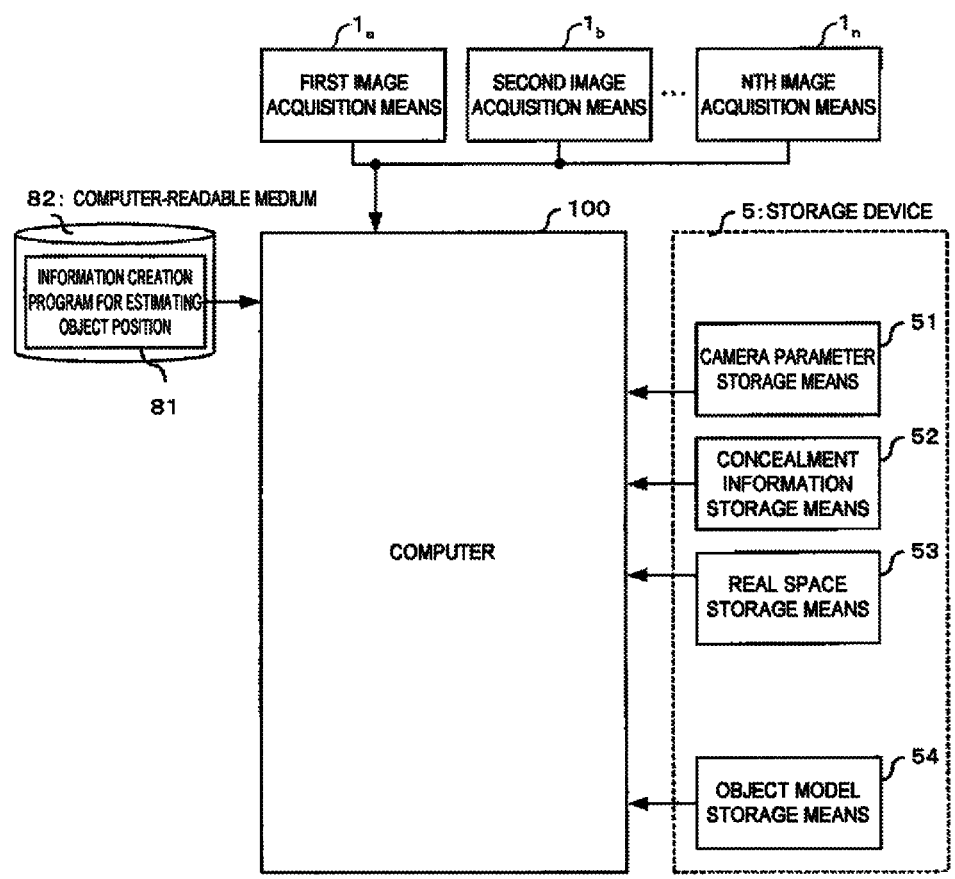
FIG. 17 is a block diagram showing a specific configuration example of the present invention.

FIG. 17 is a block diagram showing a specific configuration example of the present invention. The information creation device for estimating object position of the present invention is provided with each of 1st to nth image acquisition means 1a to 1n, a computer 100 and the storage device 5 as shown in FIG. 17.

Each of the image acquisition means 1a to 1n, the storage device 5 and a computer-readable medium 82 are connected to the computer 100.

The storage device 5 includes the camera parameter storage means 51, the concealment information storage means 52 (or the concealment information storage means 52a), the real space storage means 53 and the object model storage means 54 as indicated in each of the embodiments.

The computer-readable medium 82 is a storage device such as a magnetic disk or semiconductor memory, and stores an information creation program 81 for estimating object position.

The computer 100, for example, reads the information creation program 81 for estimating object position from the computer-readable medium 82 during startup, and operates in the form of the data processing device 4 indicated in each of the embodiments in accordance with the information creation program 81 for estimating object position. Namely, the computer 100 operates as the object region acquisition means 41, the score acquisition means 42, the view status determination means 43 (or the view status determination means 43a), the existence probability calculation means 44 and the estimation information creation means 45 in accordance with the information creation program 81 for estimating object position. Moreover, the computer 100 may also operate as the position estimation means 46 (see FIG. 14) in accordance with a program.

In this manner, the object region acquisition means 41, the score acquisition means 42, the view information determination means 43 (or the view information determination means 43a), the existence probability calculation means 44, the estimation information creation means 45 and the position estimation means 46 may be realized by the computer 100 operating in accordance with a program.

In addition, each of the means may also be realized with respectively separate dedicated circuits.

Figure 18:
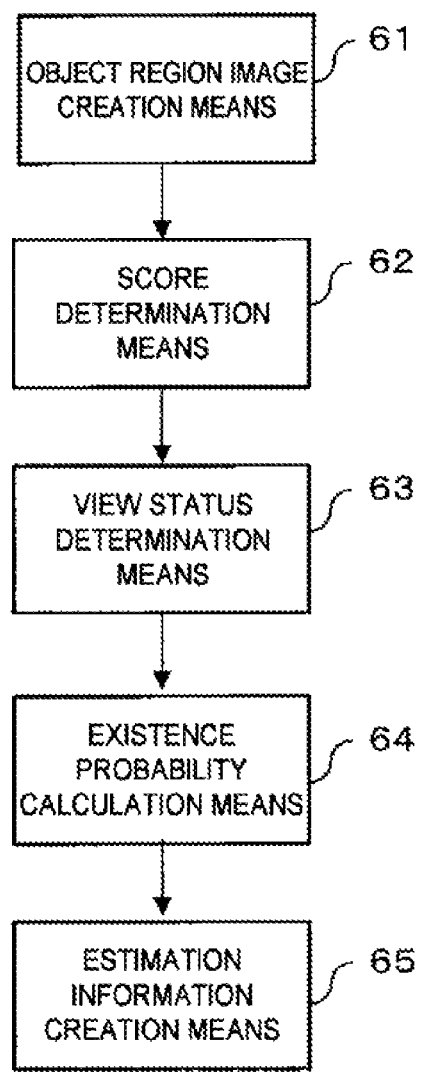
FIG. 18 is a block diagram showing a minimum configuration of the present invention.
Figure 19:
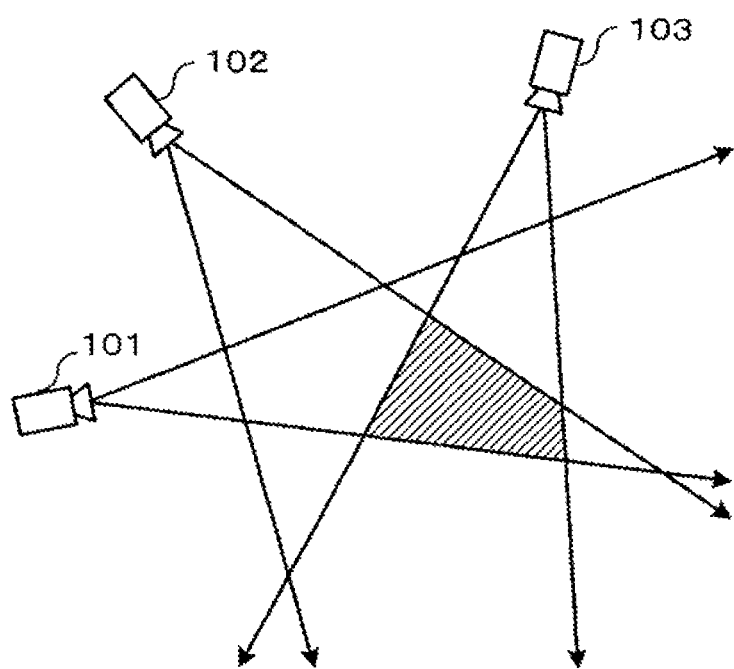
FIG. 19 is an explanatory drawing showing an example of a range over which object position can be estimated in a system related to the present invention.
Figure 20:
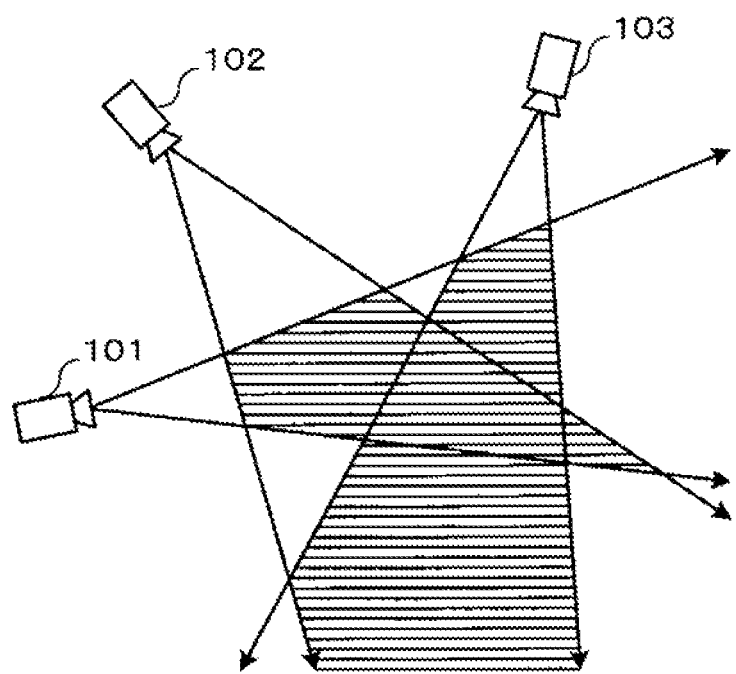
FIG. 20 is an explanatory drawing showing an example in which the range over which position can be estimated in FIG. 19 has been expanded.
Figure 21:
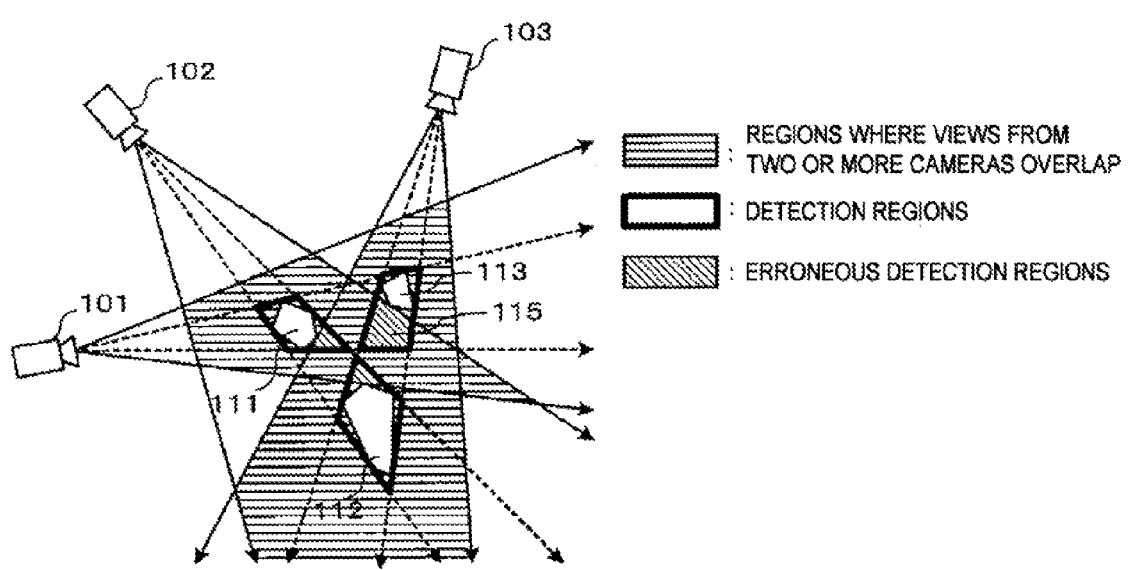
FIG. 21 is an explanatory drawing showing a case in which erroneous detection occurs in the case of having expanded the range over which position can be estimated.

Next, an explanation is provided of a minimum configuration of the present invention. FIG. 18 is a block diagram showing a minimum configuration of the present invention. The information creation device for estimating object position of the present invention is provided with object region image creation means 61, score determination means 62, view status determination means 63, existence probability calculation means 64 and estimation information creation means 65.

The object region image creation means 61 (for example, the object region acquisition means 41) creates an object region image indicating a region that represents a target object in an image from each of the images respectively acquired by a plurality of image acquisition means (for example, the image acquisition means 1a to 1n).

The score determination means 62 (for example, the score acquisition means 42) defines a score indicating the degree to which a point in real space in each of the images respectively acquired by the plurality of image acquisition means accurately represents a target object targeted for position estimation for each combination of the image acquisition means and the point in real space by referencing object region images.

The view status determination means 63 (for example, the view status determination means 43 or 43a) determines the status of view to each point in real space from each image acquisition means using non-target object presence information indicating where a non-target object that conceals a target object from image acquisition means is present, and determines score probability density functions in the case a point is a target object and in the case a point is not a target object for each combination of the image acquisition means and the point in real space according to the results of determination of view status.

The existence probability calculation means 64 (for example, the existence probability calculation means 44) determines the existence probability of a target object being present at a point in real space by integrating score probability density functions (for example, by carrying out the calculation of formula (1)) corresponding to the result of determination of the status of view to a point in real space from the image acquisition means.

The estimation information creation means 65 creates position estimation information (for example, v(x,y)) for estimating at what position a target object, which is known to be allocated at a prescribed height relative to a prescribed plane (for example, the xy plane) in real space, is present for each point in the prescribed plane based on existence probabilities determined for each point in real space.

As a result of employing this configuration, position estimation information of an object can be created so as to expand the range over which object position can be estimated as well as maintain the accuracy of estimating object position. In addition, position estimation information can be created for estimating the position of a target object over a wide range and with high accuracy even if a non-target object is present that conceals a target object.

In addition, in the previously described embodiments, a configuration is disclosed in which the view status determination means 63 determines the status of view to each point in real space from each image acquisition means using a non-target object binary image (for example, a stationary object binary image), which is a binary image in which a pixel value of a region representing a non-target object in an image acquired by image acquisition means is defined to be a first pixel value and a pixel value of a region other than that region is defined to be a second pixel value, as non-target object presence information.

In addition, in the previously described embodiments, a configuration is disclosed in which the view status determination means 63 converts a point in real space to two-dimensional coordinates corresponding to image acquisition means, and determines the status of view to a point in real space from image acquisition means to not be satisfactory in the case the converted coordinates are outside the range of a non-target object binary image, determines the status of view to a point in real space from image acquisition means to be satisfactory in the case the converted coordinates correspond to a region other than a non-target object within the range of the non-target object binary image, determines the status of view to a point in real space from the image acquisition means to be satisfactory in the case the converted coordinates correspond to a region of a non-target object within the range of the non-target object binary image and a score for a combination of image acquisition means and a point in real space is equal to or greater than a threshold value, and determines the status of view to a point in real space from image acquisition means to be unclear in the case the converted coordinates correspond to a region of a non-target object within the range of the non-target object binary image and a score for a combination of image acquisition means and a point in real space is less than a threshold value.

In addition, in the previously described embodiments, a configuration is disclosed in which the object region image creation means 61 creates an object region image in which pixel values over a range of 0 to 1 are defined for each pixel, the score determination means 62 determines a score over a range of 0 to 1 by referencing the object region image, and the view status determination means 63 determines a probability density function in which the function value increases as the score approaches 1 as a score probability density function in the case a point is a target object with respect to a combination of image acquisition mean and a point in real space in the case the status of view to the point in real space from the image acquisition means has been determined to be satisfactory, determines a probability density function in which the function value increases as the score approaches 0 as a score probability density function in the case the point is not a target object, and determines a function having a uniform distribution as a score probability density function in the case the point is a target object and the case in which is it not a target object in the case the status of view to the point in real space from the image acquisition means has been determined to not be satisfactory or in the case view status has been determined to be unclear.

In addition, in the previously described embodiments, a configuration is disclosed in which the view status determination means 63 determines the status of view to each point in real space from each image acquisition means by using information of a three-dimensional region occupied by a non-target object in real space as non-target object presence information.

In addition, in the previously described embodiments, a configuration is disclosed in which the view status determination means 63 converts a point in real space to two-dimensional coordinates corresponding to image acquisition means, and determines the status of view to a point in real space from image acquisition means to be not satisfactory in the case the converted coordinates are outside the range of an object region image corresponding to image acquisition means, determines the status of view to a point in real space from image acquisition means to be satisfactory in the case the converted coordinates are within the range of an object region image corresponding to image acquisition means and a non-target object is not present between image acquisition means and a point in real space, and determines the status of view to a point in real space from image acquisition means to not be satisfactory in the case the converted coordinates are within the range of an object region image corresponding to image acquisition means and a non-target object is present between image acquisition means and a point in real space.

In addition, in the previously described embodiments, a configuration is disclosed in which the object region image creation means 61 creates an object region image in which pixel values over a range of 0 to 1 are defined for each pixel, the score determination means 62 determines a score over a range of 0 to 1 by referencing the object region image, and the view status determination means 63 determines a probability density function in which the function value increases as the score approaches 1 as a score probability density function in the case a point is a target object with respect to a combination of image acquisition means and a point in real space in the case the status of view to the point in real space from the image acquisition means has been determined to be satisfactory, determines a probability density function in which the function value increases as the score approaches 0 as a score probability density function in the case the point is not a target object, and determines a function having a uniform distribution as a score probability density function in the case the point is a target object and the case in which is it not a target object in the case the status of view to the point in real space from the image acquisition means has been determined to not be satisfactory.

In addition, in the previously described embodiments, a configuration is disclosed in which the object region image creation means 61 creates an object region image in which pixel values over a range of 0 to 1 are defined for each pixel, the score determination means 62 determines a score over a range of 0 to 1 by referencing the object region image, and the view status determination means 63 converts a point in real space to two-dimensional coordinates corresponding to image acquisition means, determines a function having a uniform distribution as a score probability density function in the case the point is a target object and the case it is not a target object with respect to a combination of the image acquisition means and the point in real space in the case the converted coordinates are outside the range of a non-target object binary image, determines a probability density function in which the function value increases as the score approaches 1 as a score probability density function in the case the point is a target object with respect to a combination of the image acquisition means and the point in real space in the case the converted coordinates correspond to a region other than a non-target object within the range of the non-target object binary image, determines a probability density function in which the function value increases as the score approaches 0 as a score probability density function in the case the point is not a target object, determines a probability density function, in which a range of variation of a function value is a range of variation corresponding to a score determined by score determination means and the function value increases as the score approaches 1, as a score probability density function in the case the point is a target object with respect to a combination of the image acquisition means and the point in real space in the case the converted coordinates correspond to a region of a non-target object within the range of the non-target object binary image, and determines a probability density function, in which a range of variation of a function value is a range of variation corresponding to a score determined by score determination means and the function value increases as the score approaches 0, as a score probability density function in the case the point is not a target object.

In addition, in the previously described embodiments, a configuration is disclosed in which the existence probability calculation means 64 calculates a posterior probability of the presence of a target object and the posterior probability of the absence of a target object for each point in real space from a score determined for each combination of image acquisition device and point in real space, a score probability density function in the case a target object is present at a point, and a score probability density function in the case a target object is not present at a point, and the estimation information creation means 65 creates position estimation information by using the posterior probabilities calculated by the existence probability calculation means.

In addition, in the previously described embodiments, a configuration is disclosed in which the estimation information creation means 65 compares the posterior probability of the presence of a target object and the posterior probability of the absence of a target object for each point in real space, defines a prescribed value meaning that an object is present (for example, by defining the value of V(x,y,z) to be 1) for object information indicating the result of a determination of the presence or absence of a target object at a point in real space if the condition is satisfied that the posterior probability of the presence of a target object is larger or defines a value of 0 for the object information (for example, by defining the value of V(x,y,z) to be 0) if the condition is not satisfied, and creates position estimation information by specifying a region occupied by the target object in the case the target object is present at that point for each point in a prescribed plane in real space and adding the object information of each point in that region.

In addition, in the previously described embodiments, a configuration is disclosed in which the object region image creation means 61 calculates the probability of an object being present at a pixel of an image acquired by image acquisition means over a range of 0 to 1, and creates an object region image by defining the pixel value of each pixel of an object region image corresponding to each pixel of the image acquired by the image acquisition means as the value of that probability.

In addition, in the previously described embodiments, a configuration is disclosed in which the score determination means 62 converts a point in real space to two-dimensional coordinates corresponding to image acquisition means, and defines a pixel value of a pixel of an object region image indicated by the converted coordinates as a score for a combination of a point in real space and image acquisition means in the case the converted coordinates are within the range of an object region image, and defines a fixed value indicating that a point in real space is outside the field of image acquisition means as a score for a combination of a point in real space and image acquisition means in the case the converted coordinates are outside the range of an object region image.

In addition, in the previously described embodiments, a configuration is disclosed in which position estimation means (for example, the position estimation means 46) is provided that estimates at what position in a prescribed plane a target object is present using position estimation information created for each point in the prescribed plane in real space.

This application claims priority on the basis of Japanese Patent Application No. 2009-051173 filed on Mar. 4, 2009, the entire disclosure of which is incorporated herein.

Although the preceding description has provided an explanation of the invention of the present application with reference to embodiments thereof, the invention of the present application is not limited to the previously described embodiments. The configuration and details of the invention of the present application can be modified in various ways as understood by a person with ordinary skill within the scope of the invention of the present application.

All or a portion of the previously described embodiments can be described as indicated in the following addenda, although not limited thereto.

(Addition 1) An information creation device for estimating object position, comprising:

object region image creation section for creating an object region image that indicates a region representing a target object in an image from each of images respectively acquired by a plurality of image acquisition sections;

score determination section for determining a score, which indicates how accurately points in real space in each of the images respectively acquired by the plurality of image acquisition sections represent the target object targeted for position estimation, by referencing an object region image for each combination of the image acquisition section and points in real space;

view status determination section for determining status of view to each point in real space from each of the image acquisition section by using non-target object presence information indicating to the image acquisition section where a non-target object that conceals a target object is present, and determining probability density functions of a score in the case of points being a target object and in the case of not being a target object for each combination of image acquisition section and points in real space in accordance with a result of the view status determination;

existence probability calculation section for determining an existence probability of a target object being present at a point in real space by integrating the probability density functions corresponding to the result of determining the status of view to points in real space from the image acquisition section, and estimation information creation section for creating information for position estimation, for each point in a prescribed plane, in order to estimate at what position in the prescribed plane a target object is present, which is known to be arranged at a prescribed height relative to the prescribe plane in real space, based on the existence probability determined for each point in real space by the existence probability section.

(Addition 2) The information creation device for estimating object position described in Addition 1, wherein the view status determination section determines the status of view to each point in real space from each image acquisition section using, as non-target object presence information, a non-target object binary image, which is a binary image in which a pixel value of a region representing a non-target object in an image acquired by the image acquisition section is defined to be a first pixel value and a pixel value of a region other than that region is defined to be a second pixel value.

(Addition 3) The information creation device for estimating object position described in Addition 2, wherein the view status determination section converts a point in real space to two-dimensional coordinates corresponding to the image acquisition section, and determines the status of view to the point in real space from the image acquisition section to not be satisfactory in the case converted coordinates are outside a range of a non-target object binary image, determines the status of view to the point in real space from the image acquisition section to be satisfactory in the case converted coordinates correspond to a region other than a non-target object within a range of the non-target object binary image, determines the status of view to the point in real space from the image acquisition section to be satisfactory in the case converted coordinates correspond to a region of a non-target object within a range of the non-target object binary image and a score for a combination of the image acquisition section and the point in real space is equal to or greater than a threshold value, and determines the status of view to the point in real space from the image acquisition section to be unclear in the case converted coordinates correspond to a region of a non-target object within a range of the non-target object binary image and a score for a combination of the image acquisition section and the point in real space is less than a threshold value.

(Addition 4) The image creation device for estimating object position described in Addition 3, wherein the object region image creation section creates an object region image in which pixel values in a range of 0 to 1 are defined for each pixel, the score determination section determines a score in a range of 0 to 1 by referencing the object region image, and the view status determination section determines a probability density function in which a function value increases as the score approaches 1 as a score probability density function in the case the point is a target object with respect to a combination of image acquisition section and a point in real space when the status of view to the point in real space from the image acquisition section has been determined to be satisfactory, determines a probability density function in which the function value increases as the score approaches 0 as a score probability density function in the case the point is not a target object, and determines a function having a uniform distribution as a score probability density function in the case the point is a target object and in the case in which the point is not a target object in the case the status of view to the point in real space from the image acquisition section has been determined to not be satisfactory or in the case the status of view has been determined to be unclear.

(Addition 5) The information creation device for estimating object position described in Addition 1, wherein the view status determination section determines the status of view to each point in real space from each image acquisition section by using, as non-target object presence information, information of a three-dimensional region occupied by a non-target object in real space.

(Addition 6) The information creation device for estimating object position described in Addition 5, wherein the view status determination section converts a point in real space to two-dimensional coordinates corresponding to the image acquisition section, and determines the status of view to the point in real space from the image acquisition section to not be satisfactory in the case the converted coordinates are outside the range of an object region image corresponding to the image acquisition section, determines the status of view to the point in real space from the image acquisition section to be satisfactory in the case the converted coordinates are within the range of an object region image corresponding to the image acquisition section and a non-target object is not present between the image acquisition section and the point in real space, and determines the status of view to the point in real space from the image acquisition section to not be satisfactory in the case the converted coordinates are within the range of an object region image corresponding to the image acquisition section and a non-target object is present between the image acquisition section and the point in real space.

(Addition 7) The information creation device for estimating object position described in Addition 6, wherein the object region image creation section creates an object region image in which pixel values in a range of 0 to 1 are defined for each pixel, the score determination section determines a score in a range of 0 to 1 by referencing the object region image, and the view status determination section determines a probability density function in which the function value increases as the score approaches 1 as a score probability density function in the case a point is a target object with respect to a combination of the image acquisition section and a point in real space in the case the status of view to the point in real space from the image acquisition section has been determined to be satisfactory, determines a probability density function in which the function value increases as the score approaches 0 as a score probability density function in the case the point is not a target object, and determines a function having a uniform distribution as a score probability density function in the case the point is a target object and in the case in which the point is not a target object in the case the status of view to the point in real space from the image acquisition section has been determined to not be satisfactory.

(Addition 8) The information creation device for estimating object position described in Addition 2, wherein the object region image creation section creates an object region image in which pixel values in a range of 0 to 1 are defined for each pixel, the score determination section determines a score in a range of 0 to 1 by referencing the object region image, and the view status determination section converts a point in real space to two-dimensional coordinates corresponding to the image acquisition section, determines a function having a uniform distribution as a score probability density function in the case the point is a target object and in the case the point is not a target object with respect to a combination of the image acquisition section and the point in real space in the case the converted coordinates are outside the range of a non-target object binary image, determines a probability density function in which the function value increases as the score approaches 1 as a score probability density function in the case the point is a target object with respect to a combination of the image acquisition section and the point in real space in the case the converted coordinates correspond to a region other than a non-target object within the range of the non-target object binary image, determines a probability density function in which the function value increases as the score approaches 0 as a score probability density function in the case the point is not a target object, determines a probability density function, in which a range of variation of a function value is a range of variation corresponding to a score determined by the score determination section and the function value increases as the score approaches 1, as a score probability density function in the case the point is a target object with respect to a combination of the image acquisition section and the point in real space in the case the converted coordinates correspond to a region of a non-target object within the range of the non-target object binary image, and determines a probability density function, in which a range of variation of a function value is a range of variation corresponding to a score determined by the score determination section and the function value increases as the score approaches 0, as a score probability density function in the case the point is not a target object.

(Addition 9) The information creation device for estimating object position described in Addition 8, wherein the existence probability calculation section calculates a posterior probability of the presence of a target object and the posterior probability of the absence of a target object for each point in real space from a score determined for each combination of the image acquisition section and a point in real space, a score probability density function in the case a target object is present at a point, and a score probability density function in the case a target object is not present at a point, and the estimation information creation section creates position estimation information by using the posterior probabilities calculated by the existence probability calculation section.

(Addition 10) The information creation device for estimating object position described in Addition 9, wherein the estimation information creation section compares the posterior probability of the presence of a target object and the posterior probability of the absence of a target object for each point in real space, defines a prescribed value meaning that an object is present for object information indicating a result of a determination of the presence or absence of a target object at a point in real space when a condition is satisfied that the posterior probability of the presence of a target object is larger or defines a value of 0 for the object information when the condition is not satisfied, and creates the position estimation information by specifying a region occupied by the target object in the case the target object is present at a certain point for each point in a prescribed plane in real space and adding the object information on each point in that region.

(Addition 11) The information creation device for estimating object position described in Addition 1, wherein the object region image creation section calculates the probability of an object being present at a pixel of an image acquired by the image acquisition section in a range of 0 to 1, and creates an object region image by defining the pixel value of each pixel of an object region image corresponding to each pixel of the image acquired by the image acquisition section as the value of that probability.

(Addition 12) The information creation device for estimating object position described in Addition 1, wherein the score determination section converts a point in real space to two-dimensional coordinates corresponding to the image acquisition section, and defines a pixel value of a pixel of an object region image indicated by the converted coordinates as a score for a combination of the point in real space and the image acquisition section in the case the converted coordinates are within a range of an object region image, and defines a fixed value indicating that a point in real space is outside view of the image acquisition section as a score for a combination of the point in real space and the image acquisition section in the case the converted coordinates are outside the range of an object region image.

(Addition 13) The information creation device for estimating object position described in Addition 1, comprising position estimation section for estimating at what position in a prescribed plane in real space a target object is present by using position estimation information created for each point in the prescribed plane.

(Addition 14) An information creation method of estimating object position, comprising:

creating an object region image that indicates a region representing a target object in an image from each of the images respectively acquired by a plurality of image acquisition sections;

determining a score, which indicates how accurately points in real space in each of the images respectively acquired by the plurality of image acquisition sections represent a target object targeted for position estimation, by referencing an object region image for each combination of the image acquisition section and points in real space;

determining status of view to each point in real space from each image acquisition section by using non-target object presence information indicating to the image acquisition section where a non-target object that conceals the target object is present, and determining a probability density function of a score in the case of points being a target object and in the case of not being a target object for each combination of the image acquisition section and points in real space corresponding to a result of the view status determination;

determining an existence probability of a target object being present at a point in real space by integrating the probability density functions corresponding to the result of determining the status of view to a point in real space from an image acquisition section; and creating position estimation information for each point in a prescribed plane in order to estimate at what position in the prescribed plane a target object is present, which is known to be arranged at a prescribed height relative to the prescribe plane in real space, based on the existence probability determined for each point in real space.

(Addition 15) The information creation method of estimating object position described in Addition 14, wherein the status of view to each point in real space from each image acquisition section is determined using, as non-target object presence information, a non-target object binary image, which is a binary image in which a pixel value of a region representing a non-target object in an image acquired by the image acquisition section is defined to be a first pixel value and a pixel value of a region other than that region is defined to be a second pixel value.

(Addition 16) The information creation method of estimating object position described in Addition 15, wherein when determining the view of status, a point in real space is converted to two-dimensional coordinates corresponding to the image acquisition section, the status of view to the point in real space from the image acquisition section is determined to not be satisfactory in the case the converted coordinates are outside a range of a non-target object binary image, the status of view to the point in real space from the image acquisition section is determined to be satisfactory in the case the converted coordinates correspond to a region other than a non-target object within the range of the non-target object binary image, the status of view to the point in real space from the image acquisition section is determined to be satisfactory in the case the converted coordinates correspond to a region of a non-target object within the range of the non-target object binary image and a score for a combination of the image acquisition section and the point in real space is equal to or greater than a threshold value, and the status of view to the point in real space from the image acquisition section is determined to be unclear in the case the converted coordinates correspond to a region of a non-target object within the range of the non-target object binary image and a score for a combination of the image acquisition section and the point in real space is less than a threshold value.

(Addition 17) The information creation method of estimating object position described in Addition 16, wherein an object region image is created in which pixel values in a range of 0 to 1 are defined for each pixel, a score is determined in a range of 0 to 1 by referencing the object region image, and a probability density function is determined in which a function value increases as the score approaches 1 as a score probability density function in the case the point is a target object with respect to a combination of the image acquisition section and the point in real space in the case the status of view to the point in real space from the image acquisition section has been determined to be satisfactory, and a probability density function is determined in which the function value increases as the score approaches 0 as a score probability density function in the case the point is not a target object, and a function having a uniform distribution is determined as a score probability density function in the case the point is a target object and in the case in which the point is not a target object in the case the status of view to the point in real space from the image acquisition section has been determined to not be satisfactory or in the case the status of view has been determined to be unclear.

(Addition 18) The information creation method of estimating object position described in Addition 14, wherein the status of view to the point in real space from each image acquisition section is determined by using, as non-target object presence information, information of a three-dimensional region occupied by a non-target object in real space.

(Addition 19) The information creation method of estimating object position described in Addition 18, wherein when determining the status of view, a point in real space is converted to two-dimensional coordinates corresponding to the image acquisition section, the status of view to the point in real space from the image acquisition section is determined to not be satisfactory in the case the converted coordinates are outside the range of an object region image corresponding to the image acquisition section, the status of view to the point in real space from the image acquisition section is determined to be satisfactory in the case the converted coordinates are within the range of an object region image corresponding to an image acquisition section and a non-target object is not present between the image acquisition section and the point in real space, and the status of view to the point in real space from the image acquisition section is determined to not be satisfactory in the case the converted coordinates are within the range of an object region image corresponding to the image acquisition section and a non-target object is present between the image acquisition section and the point in real space.

(Addition 20) The information creation method of estimating object position described in Addition 19, wherein an object region image is created in which pixel values in a range of 0 to 1 are defined for each pixel, a score in a range of 0 to 1 is determined by referencing the object region image, a probability density function in which the function value increases as the score approaches 1 is determined as a score probability density function in the case a point is a target object with respect to a combination of the image acquisition section and a point in real space in the case the status of view to the point in real space from the image acquisition section has been determined to be satisfactory, a probability density function in which the function value increases as the score approaches 0 is determined as a score probability density function in the case the point is not a target object, and a function having a uniform distribution is determined as a score probability density function in the case the point is a target object and in the case in which the point is not a target object in the case the status of view to the point in real space from the image acquisition section has been determined to not be satisfactory.

(Addition 21) The information creation method of estimating object position described in Addition 15, wherein an object region image is created in which pixel values in a range of 0 to 1 are defined for each pixel, a score is determined in a range of 0 to 1 by referencing the object region image, a point in real space is converted to two-dimensional coordinates corresponding to the image acquisition section, a function having a uniform distribution is determined as a score probability density function in the case the point is a target object and in the case the point is not a target object with respect to a combination of the image acquisition section and the point in real space in the case the converted coordinates are outside the range of a non-target object binary image, a probability density function in which the function value increases as the score approaches 1 is determined as a score probability density function in the case the point is a target object with respect to a combination of the image acquisition section and the point in real space in the case the converted coordinates correspond to a region other than a non-target object within the range of the non-target object binary image, a probability density function in which the function value increases as the score approaches 0 is determined as a score probability density function in the case the point is not a target object, a probability density function, in which a range of variation of a function value is a range of variation corresponding to a score determined by the score determination section and the function value increases as the score approaches 1, is determined as a score probability density function in the case the point is a target object with respect to a combination of the image acquisition section and the point in real space in the case the converted coordinates correspond to a region of a non-target object within the range of the non-target object binary image, and a probability density function, in which a range of variation of a function value is a range of variation corresponding to a score determined by the score determination section and the function value increases as the score approaches 0, is determined as a score probability density function in the case the point is not a target object.

(Addition 22) The information creation method of estimating object position described in Addition 21, wherein when determining an existence probability that a non-target object is present at a point in real space, a posterior probability of the presence of a target object and the posterior probability of the absence of a target object are calculated for each point in real space from a score determined for each combination of the image acquisition section and a point in real space, a score probability density function in the case a target object is present at a point, and a score probability density function in the case a target object is not present at a point, and position estimation information is created by using the posterior probability of the presence of a target object and the posterior probability of the absence of a target object.

(Addition 23) The information creation method of estimating object position described in Addition 22, wherein the posterior probability of the presence of a target object and the posterior probability of the absence of a target object are compared for each point in real space, a prescribed value meaning that an object is present is defined for object information indicating a result of a determination of the presence or absence of a target object at a point in real space when the condition is satisfied that the posterior probability of the presence of a target object is larger, or a value of 0 is defined for the object information when the condition is not satisfied, and position estimation information is created by specifying a region occupied by the target object in the case the target object is present at that point for each point in a prescribed plane in real space and adding the object information of each point in that region.

(Addition 24) The information creation method of estimating object position described in Addition 14, wherein the probability of an object being present at a pixel of an image acquired by the image acquisition section is calculated in a range of 0 to 1, and an object region image is created by defining as the value of that probability the pixel value of each pixel of an object region image corresponding to each pixel of the image acquired by the image acquisition section.

(Addition 25) The information creation method of estimating object position described in Addition 14, wherein a point in real space is converted to two-dimensional coordinates corresponding to the image acquisition section, a pixel value of a pixel of an object region image indicated by the converted coordinates is defined as a score for a combination of the point in real space and the image acquisition section in the case the converted coordinates are within the range of an object region image, and a fixed value indicating that a point in real space is outside view of the image acquisition section is defined as a score for a combination of the point in real space and the image acquisition section in the case the converted coordinates are outside the range of an object region image.

(Addition 26) The information creation method of estimating object position described in Addition 14, wherein the position at which a target object is present in a prescribed plane in real space is estimated using position estimation information created for each point in the prescribed plane.

(Addition 27) An information creation program for estimating object position, causing a computer to execute:

object region image creation processing for creating an object region image that indicates a region representing a target object in an image from each image respectively acquired by a plurality of image acquisition sections;

score determination processing for determining a score, which indicates how accurately points in real space in each of the images respectively acquired by a plurality of image acquisition sections represent a target object targeted for position estimation, by referencing an object region image for each combination of the image acquisition section and points in real space;

view status determination processing for determining status of view to each point in real space from each image acquisition section by using non-target object presence information indicating to the image acquisition section where a non-target object that conceals the target object is present, and determining a probability density function of a score in the case of points being a target object and the case of not being a target object for each combination of the image acquisition section and points in real space corresponding to the result of a view status determination;

existence probability calculation processing for determining an existence probability of the target object being present at a point in real space by integrating probability density functions corresponding to the result of determining the status of view to a point in real space from the image acquisition section; and estimation information creation processing for creating position estimation information for each point in a prescribed plane in real space in order to estimate at what position in the prescribed plane a target object is present, which is known to be arranged at a prescribed height relative to the prescribe plane, based on the existence probability determined for each point in real space in the existence probability calculation processing.

(Addition 28) The information creation program for estimating object position described in Addition 27, wherein the computer is caused, in the view status determination processing, to determine the status of view to each point in real space from each image acquisition section by using as non-target object presence information a non-target object binary image, which is a binary image in which a pixel value of a region representing a non-target object in an image acquired by an image acquisition section is defined to be a first pixel value and a pixel value of a region other than that region is defined to be a second pixel value.

(Addition 29) The information creation program for estimating object position described in Addition 28, wherein the computer is caused, in the view status determination processing, to convert a point in real space is converted to two-dimensional coordinates corresponding to the image acquisition section, to determine the status of view to the point in real space from the image acquisition section to not be satisfactory in the case the converted coordinates are outside the range of a non-target object binary image, to determine the status of view to the point in real space from the image acquisition section is to be satisfactory in the case the converted coordinates correspond to a region other than a non-target object within the range of the non-target object binary image, to determine the status of view to the point in real space from the image acquisition section to be satisfactory in the case the converted coordinates correspond to a region of a non-target object within the range of the non-target object binary image and a score for a combination of the image acquisition section and the point in real space is equal to or greater than a threshold value, and to determine the status view to the point in real space from the image acquisition section to be unclear in the case the converted coordinates correspond to a region of a non-target object within the range of the non-target object binary image and a score for a combination of the image acquisition section and the point in real space is less than a threshold value.

(Addition 30) The information creation program for estimating object position described in Addition 29, wherein the computer is caused to create an object region image in which pixel values in a range of 0 to 1 are defined for each pixel in the object region image creation processing, to determine a score in a range of 0 to 1 by referencing the object region image in the score determination processing, and in the view status determination processing, to determine a probability density function in which a function value increases as the score approaches 1 as a score probability density function in the case the point is a target object with respect to a combination of the image acquisition section and the point in real space in the case the status of view to the point in real space from the image acquisition section has been determined to be satisfactory and a probability density function is determined in which a function value increases as the score approaches 0 as a score probability density function in the case the point is not a target object, and to determine a function having a uniform distribution as a score probability density function in the case the point is a target object and the case in which the point is not a target object in the case the status of view to the point in real space from the image acquisition section has been determined to not be satisfactory or in the case the status of view has been determined to be unclear.

(Addition 31) The information creation program for estimating object position described in Addition 27, wherein the computer is caused to determine in the view status determination processing the status of view to each point in real space from each image acquisition section by using information of a three-dimensional region occupied by a non-target object in real space as non-target object presence information.

(Addition 32) The information creation program for estimating object position described in Addition 31, wherein the computer is caused, in the view status determination processing, to convert a point in real space to two-dimensional coordinates corresponding to the image acquisition section, to determine the status of view to the point in real space from the image acquisition section to not be satisfactory in the case the converted coordinates are outside the range of an object region image corresponding to the image acquisition section, to determine the status of view to the point in real space from the image acquisition section to be satisfactory in the case the converted coordinates are within the range of an object region image corresponding to the image acquisition section and a non-target object is not present between the image acquisition section and the point in real space, and to determine the status of view to the point in real space from the image acquisition section to not be satisfactory in the case the converted coordinates are within the range of an object region image corresponding to the image acquisition section and a non-target object is present between the image acquisition section and the point in real space.

(Addition 33) The information creation program for estimating object position described in Addition 32, wherein the computer is caused to create an object region image in which pixel values in a range of 0 to 1 are defined for each pixel in the object region image creation processing, to determine a score in a range of 0 to 1 by referencing the object region image in the score determination processing, and in the view status determination processing, to determine a probability density function, in which a function value increases as the score approaches 1, as a score probability density function in the case a point is a target object with respect to a combination of the image acquisition section and a point in real space in the case the status of view to the point in real space from the image acquisition section has been determined to be satisfactory, and to determine a probability density function, in which a function value increases as the score approaches 0, as a score probability density function in the case the point is not a target object, and to determine a function having a uniform distribution as a score probability density function in the case the point is a target object and the case in which the point is not a target object in the case the status of view to the point in real space from the image acquisition section has been determined to not be satisfactory.

(Addition 34) The information creation program for estimating object position described in Addition 28, wherein the computer is caused to create an object region image in which pixel values in a range of 0 to 1 are defined for each pixel in the object region image creation processing, to determine a score in a range of 0 to 1 by referencing the object region image in the score determination processing, and in the view status determination processing, to convert a point in real space to two-dimensional coordinates corresponding to the image acquisition section, to determine a function having a uniform distribution as a score probability density function in the case the point is a target object and in the case the point is not a target object with respect to a combination of the image acquisition section and the point in real space in the case the converted coordinates are outside the range of a non-target object binary image, to determine a probability density function, in which a function value increases as the score approaches 1, as a score probability density function in the case the point is a target object with respect to a combination of the image acquisition section and the point in real space in the case the converted coordinates correspond to a region other than a non-target object within the range of the non-target object binary image, and to determine a probability density function, in which a function value increases as the score approaches 0, as a score probability density function in the case the point is not a target object, to determine a probability density function, in which a range of variation of a function value is a range of variation corresponding to a score determined in the score determination processing and the function value increases as the score approaches 1, as a score probability density function in the case the point is a target object with respect to a combination of the image acquisition section and the point in real space in the case the converted coordinates correspond to a region of a non-target object within the range of the non-target object binary image, and to determine a probability density function, in which a range of variation of a function value is a range of variation corresponding to a score determined in the score determination processing and the threshold value increases as the score approaches 0, as a score probability density function in the case the point is not a target object.

(Addition 35) The information creation program for estimating object position described in Addition 34, wherein the computer is caused to calculate a posterior probability of the presence of a target object and a posterior probability of the absence of a target object for each point in real space from a score determined for each combination of the image acquisition section and a point in real space, a score probability density function in the case a target object is present at a point, and a score probability density function in the case a target object is not present at a point in the existence probability calculation processing, and to create position estimation information in the estimation information creation processing by using the posterior probabilities calculated in the existence probability calculation processing.

(Addition 36) The information creation program for estimating object position described in Addition 35, wherein the computer is caused, in the estimation information creation processing, to compare the posterior probability of the presence of a target object with the posterior probability of the absence of a target object for each point in real space, and to define a prescribed value meaning that an object is present for object information indicating the result of a determination of the presence or absence of a target object at a point in real space when the condition is satisfied that the posterior probability of the presence of a target object is larger, or moreover to define a value of 0 for the object information when the condition is not satisfied, and to create position estimation information by specifying a region occupied by the target object in the case the target object is present at a certain point for each point in a prescribed plane in real space and adding the object information of each point in that region.

(Addition 37) The information creation program for estimating object position described in Addition 27, wherein the computer is caused to calculate the probability of an object being present at a pixel of an image acquired by the image acquisition section in a range of 0 to 1, and to create an object region image by defining the pixel value of each pixel of an object region image corresponding to each pixel of the image acquired by the image acquisition section as the value of that probability in the object region image creation processing.

(Addition 38) The information creation program for estimating object position described in Addition 27, wherein the computer is caused to convert a point in real space to two-dimensional coordinates corresponding to the image acquisition section, and to define a pixel value of a pixel of an object region image indicated by the converted coordinates as a score for a combination of the point in real space and the image acquisition section in the case the converted coordinates are within the range of an object region image, and to define a fixed value indicating that a point in real space is outside the field of an image acquisition section as a score for a combination of the point in real space and the image acquisition section in the case the converted coordinates are outside the range of an object region image in the score determination processing.

(Addition 39) The information creation program for estimating object position described in Addition 27, wherein the computer is caused to execute position estimation processing in which the position at which a target object is present in a prescribed plane in real space is estimated using position estimation information created for each point in the prescribed plane.

The present invention can be preferably applied to an information creation device for estimating object position, which creates information for estimating the position of an object from a plurality of images, and to an object position estimation device for estimating object position that uses that information. In addition, the present invention can also be applied to monitoring fields requiring object position to be estimated from cameras or accumulated images. For example, the present invention can be applied to detection of intruders, detection of suspicious persons, detection of unattended suspicious objects, detection of package theft, detection of unauthorized multiple-person passage, and detection of congestion and long lines. In addition, the present invention can be applied to an input interface that estimates object position from cameras or accumulated images and inputs that positional information to a device. In addition, the present invention can be applied to a video/image search device and the like that estimates the position of an object and uses the resulting positional information as a trigger key.

1a to 1n Image acquisition means
4 Storage device
5 Data processing device
41 Object region acquisition means
42 Score acquisition means
43 View status determination means
44 Existence probability calculation means
45 Estimation information creation means
51 Camera parameter storage means
52 Concealment information storage means
53 Real space storage means
54 Object model storage means

I claim:

1. An information creation device for estimating object position, comprising:

an object region image creation section for creating an object region image that indicates a region representing a target object in an image from each of images respectively acquired by a plurality of image acquisition sections;

a score determination section for determining a score, which indicates how accurately points in real space in each of the images respectively acquired by the plurality of image acquisition sections represent the target object targeted for position estimation, by referencing an object region image for each combination of an image acquisition section of the plurality of image acquisition sections and points in real space;

a view status determination section for determining a status of view to each point in real space from each of the plurality of image acquisition sections by using non-target object presence information indicating to each of the plurality of image acquisition sections where a non-target object that conceals a target object is present, and determining probability density functions of a score in the case of points being a target object and in the case of not being a target object for each combination of each of the plurality of image acquisition sections and points in real space in accordance with a result of the determined view status;

an existence probability calculation section for determining an existence probability of a target object being present at each point in real space by integrating the probability density functions corresponding to the result of the determined view status of to points in real space from each of the plurality of image acquisition sections, and an estimation information creation section for creating information for position estimation, for each point in a prescribed plane, in order to estimate at what position in the prescribed plane in real space a target object is present, based on the existence probability of a target object being present at each point in real space determined by the existence probability section.

2. The information creation device for estimating object position according to claim 1, wherein the view status determination section determines the status of view to each point in real space from each of the plurality of image acquisition sections using, as non-target object presence information, a non-target object binary image, which is a binary image in which a pixel value of a region representing a non-target object in an image acquired by each of the plurality of the image acquisition sections is defined to be a first pixel value and a pixel value of a region other than that region is defined to be a second pixel value.

3. The information creation device for estimating object position according to claim 2, wherein the view status determination section converts a point in real space to two-dimensional coordinates corresponding to each of the plurality of the image acquisition sections, and determines the status of view to the point in real space from each of the plurality of the image acquisition sections to not be satisfactory in the case converted coordinates are outside a range of a non-target object binary image, determines the status of view to the point in real space from each of the plurality of the image acquisition sections to be satisfactory in the case converted coordinates correspond to a region other than a non-target object within a range of the non-target object binary image, determines the status of view to the point in real space from each of the plurality of the image acquisition sections to be satisfactory in the case converted coordinates correspond to a region of a non-target object within a range of the non-target object binary image and a score for a combination of each of the plurality of the image acquisition sections and the point in real space is equal to or greater than a threshold value, and determines the status of view to the point in real space from each of the plurality of the image acquisition sections to be unclear in the case converted coordinates correspond to a region of a non-target object within a range of the non-target object binary image and a score for a combination of each of the plurality of the image acquisition sections and the point in real space is less than a threshold value.

4. The information creation device for estimating object position according to claim 3, wherein the object region image creation section creates an object region image in which pixel values in a range of 0 to 1 are defined for each pixel, the score determination section determines a score in a range of 0 to 1 by referencing the object region image, and the view status determination section determines a probability density function in which a function value increases as the score approaches 1 as a score probability density function in the case the point is a target object with respect to a combination of each of the plurality of image acquisition sections and a point in real space when the status of view to the point in real space from each of the plurality of image acquisition sections has been determined to be satisfactory, determines a probability density function in which the function value increases as the score approaches 0 as a score probability density function in the case the point is not a target object, and determines a function having a uniform distribution as a score probability density function in the case the point is a target object and in the case in which the point is not a target object in the case the status of view to the point in real space from an image acquisition section of the plurality of image acquisition sections has been determined to not be satisfactory or in the case the status of view has been determined to be unclear.

5. The information creation device for estimating object position according to claim 2, wherein the object region image creation section creates an object region image in which pixel values in a range of 0 to 1 are defined for each pixel, the score determination section determines a score in a range of 0 to 1 by referencing the object region image, and the view status determination section converts a point in real space to two-dimensional coordinates corresponding to each of the plurality of image acquisition section, determines a function having a uniform distribution as a score probability density function in the case the point is a target object and in the case the point is not a target object with respect to a combination of each of the image acquisition sections of the plurality of image acquisition sections and the point in real space in the case the converted coordinates are outside the range of a non-target object binary image, determines a probability density function in which the function value increases as the score approaches 1 as a score probability density function when point is a target object with respect to a combination of an image acquisition section of the plurality of image acquisition sections and the point in real space in the case the converted coordinates correspond to a region other than a non-target object within the range of the non-target object binary image, determines a probability density function in which the function value increases as the score approaches 0 as a score probability density function in the case the point is not a target object, determines a probability density function, in which a range of variation of a function value is a range of variation corresponding to a score determined by the score determination section and the function value increases as the score approaches 1, as a score probability density function in the case the point is a target object with respect to a combination of the image acquisition section of the plurality of image acquisition sections and the point in real space in the case the converted coordinates correspond to a region of a non-target object within the range of the non-target object binary image, and determines a probability density function, in which a range of variation of a function value is a range of variation corresponding to a score determined by the score determination section and the function value increases as the score approaches 0, as a score probability density function in the case the point is not a target object.

6. The information creation device for estimating object position according to claim 5, wherein the existence probability calculation section calculates a posterior probability of the presence of a target object and the posterior probability of the absence of a target object for each point in real space from a score determined for each combination of an image acquisition section of the plurality of image acquisition sections and a point in real space, a score probability density function in the case a target object is present at a point, and a score probability density function in the case a target object is not present at a point, and the estimation information creation section creates position estimation information by using the posterior probabilities calculated by the existence probability calculation section.

7. The information creation device for estimating object position according to claim 6, wherein the estimation information creation section compares the posterior probability of the presence of a target object and the posterior probability of the absence of a target object for each point in real space, defines a prescribed value meaning that an object is present for object information indicating a result of a determination of the presence or absence of a target object at a point in real space when a condition is satisfied that the posterior probability of the presence of a target object is larger or defines a value of 0 for the object information when the condition is not satisfied, and creates the position estimation information by specifying a region occupied by the target object in the case the target object is present at a certain point for each point in a prescribed plane in real space and adding the object information on each point in that region.

8. The information creation device for estimating object position according to claim 1, wherein the view status determination section determines the status of view to each point in real space from each of the plurality of image acquisition sections by using, as non-target object presence information, information of a three-dimensional region occupied by a non-target object in real space.

9. The information creation device for estimating object position according to claim 8, wherein the view status determination section converts a point in real space to two-dimensional coordinates corresponding to an image acquisition section of the plurality of image acquisition sections, and determines the status of view to the point in real space from the image acquisition section of the plurality of image acquisition sections to not be satisfactory in the case the converted coordinates are outside the range of an object region image corresponding to the image acquisition section of the plurality of image acquisition sections, determines the status of view to the point in real space from the image acquisition section of the plurality of image acquisition sections to be satisfactory in the case the converted coordinates are within the range of an object region image corresponding to the image acquisition section of the plurality of image acquisition sections and a non-target object is not present between the image acquisition section of the plurality of image acquisition sections and the point in real space, and determines the status of view to the point in real space from the image acquisition section of the plurality of image acquisition sections to not be satisfactory in the case the converted coordinates are within the range of an object region image corresponding to the image acquisition section of the plurality of image acquisition sections and a non-target object is present between the image acquisition section of the plurality of image acquisition sections and the point in real space.

10. The information creation device for estimating object position according to claim 9, wherein the object region image creation section creates an object region image in which pixel values in a range of 0 to 1 are defined for each pixel, the score determination section determines a score in a range of 0 to 1 by referencing the object region image, and the view status determination section:

determines a probability density function in which the function value increases as the score approaches 1 as a score probability density function in the case a point is a target object with respect to a combination of the image acquisition section of the plurality of image acquisition sections and a point in real space in the case the status of view to the point in real space from the image acquisition section of the plurality of image acquisition sections has been determined to be satisfactory, determines a probability density function in which the function value increases as the score approaches 0 as a score probability density function in the case the point is not a target object, and determines a function having a uniform distribution as a score probability density function in the case the point is a target object and in the case in which the point is not a target object in the case the status of view to the point in real space from the image acquisition section of the plurality of image acquisition sections has been determined to not be satisfactory.

11. The information creation device for estimating object position according to claim 1, wherein the object region image creation section calculates the probability of an object being present at a pixel of an image acquired by an image acquisition section of the plurality of image acquisition sections in a range of 0 to 1, and creates an object region image by defining the pixel value of each pixel of an object region image corresponding to each pixel of the image acquired by the image acquisition section of the plurality of image acquisition sections as the value of that probability.

12. The information creation device for estimating object position according to claim 1, wherein the score determination section converts a point in real space to two-dimensional coordinates corresponding to an image acquisition section of the plurality of image acquisition sections, and defines a pixel value of a pixel of an object region image indicated by the converted coordinates as a score for a combination of the point in real space and the image acquisition section of the plurality of image acquisition sections in the case the converted coordinates are within a range of an object region image, and defines a fixed value indicating that a point in real space is outside view of the image acquisition section of the plurality of image acquisition sections as a score for a combination of the point in real space and the image acquisition section of the plurality of image acquisition sections in the case the converted coordinates are outside the range of an object region image.

13. The information creation device for estimating object position according to claim 1, comprising position estimation section for estimating at what position in a prescribed plane in real space a target object is present by using position estimation information created for each point in the prescribed plane.

14. An information creation method of estimating object position, comprising:
creating an object region image that indicates a region representing a target object in an image from each of the images respectively acquired by a plurality of image acquisition sections;
determining a score, which indicates how accurately points in real space in each of the images respectively acquired by the plurality of image acquisition sections represent a target object targeted for position estimation, by referencing the object region image for each combination of an image acquisition section of the plurality of image acquisition sections and points in real space;
determining status of view to each point in real space from each image acquisition section of the plurality of image acquisition sections by using non-target object presence information indicating to the image acquisition section of the plurality of image acquisition sections where a non-target object that conceals the target object is present, and determining a probability density function of a score in the case of points being a target object and in the case of not being a target object for each combination of each of the image acquisition section of the plurality of image acquisition sections and points in real space corresponding to a result of the determined view status;
determining an existence probability of a target object being present at each point in real space by integrating the probability density functions corresponding to the result of determining the status of view to a point in real space from an image acquisition section of the plurality of image acquisition sections; and
creating position estimation information for each point in a prescribed plane in order to estimate at what position in the prescribed plane in real space a target object is present, based on the determined existence probability of a target object being present at each point in real space.

15. The information creation method of estimating object position according to claim 14, wherein the status of view to each point in real space from each image acquisition section of the plurality of image acquisition sections is determined using, as non-target object presence information, a non-target object binary image, which is a binary image in which a pixel value of a region representing a non-target object in an image acquired by the image acquisition section of the plurality of image acquisition sections is defined to be a first pixel value and a pixel value of a region other than that region is defined to be a second pixel value.

16. The information creation method of estimating object position according to claim 15, wherein when determining the view of status,
converting a point in real space to two-dimensional coordinates corresponding to the image acquisition section of the plurality of image acquisition sections,
determining the status of view to the point in real space from the image acquisition section of the plurality of image acquisition sections to not be satisfactory in the case the converted coordinates are outside a range of a non-target object binary image,
determining the status of view to the point in real space from the image acquisition section of the plurality of image acquisition sections to be satisfactory in the case the converted coordinates correspond to a region other than a non-target object within the range of the non-target object binary image,
determining the status of view to the point in real space from the image acquisition section of the plurality of image acquisition sections to be satisfactory in the case the converted coordinates correspond to a region of a non-target object within the range of the non-target object binary image and a score for a combination of the image acquisition section of the plurality of image acquisition sections and the point in real space is equal to or greater than a threshold value, and
determining the status of view to the point in real space from the image acquisition section of the plurality of image acquisition sections to be unclear in the case the converted coordinates correspond to a region of a non-target object within the range of the non-target object binary image and a score for a combination of the image acquisition section of the plurality of image acquisition sections and the point in real space is less than a threshold value.

17. The information creation method of estimating object position according to claim 16, wherein
creating the object region image in which pixel values in a range of 0 to 1 are defined for each pixel,
determining a score in a range of 0 to 1 by referencing the object region image, and
determining a probability density function in which a function value increases as the score approaches 1 as a score probability density function in the case the point is a target object with respect to a combination of the image acquisition section of the plurality of image acquisition sections and the point in real space in the case the status of view to the point in real space from the image acquisition section of the plurality of image acquisition sections has been determined to be satisfactory, and a probability density function is determined in which the function value increases as the score approaches 0 as a score probability density function in the case the point is not a target object, and
performing a function having a uniform distribution is determined as a score probability density function in the case the point is a target object and in the case in which the point is not a target object in the case the status of view to the point in real space from the image acquisition section of the plurality of image acquisition sections has been determined to not be satisfactory or in the case the status of view has been determined to be unclear.

18. The information creation method of estimating object position according to claim 15, wherein
an object region image is created in which pixel values in a range of 0 to 1 are defined for each pixel,
determining a score in a range of 0 to 1 by referencing the object region image,
converting a point in real space to two-dimensional coordinates corresponding to the image acquisition section of the plurality of image acquisition sections,
determining a function having a uniform distribution as a score probability density function in the case the point is a target object and in the case the point is not a target object with respect to a combination of the image acquisition section of the plurality of image acquisition sections and the point in real space in the case the converted coordinates are outside the range of a non-target binary image, determining a probability density function in which the function value increases as the score approaches 1 as a score probability density function in the case the point is a target object with respect to a combination of the image acquisition section of the plurality of image acquisition sections and the point in real space in the case the converted coordinates correspond to a region other than a non-target object within the range of the non-target object binary image, a probability density function in which the function value increases as the score approaches 0 is determined as a score probability density function in the case the point is not a target object, determining a probability density function, in which a range of variation of a function value is a range of variation corresponding to a score determined by the score determination section and the function value increases as the score approaches 1, as a score probability density function in the case the point is a target object with respect to a combination of the image acquisition section of the plurality of image acquisition sections and the point in real space in the case the converted coordinates correspond to a region of a non-target object within the range of the non-target object binary image, and a probability density function, in which a range of variation of a function value is a range of variation corresponding to a score determined by the score determination section and the function value increases as the score approaches 0, is determined as a score probability density function in the case the point is not a target object.

19. The information creation method of estimating object position according to claim 18, wherein when determining an existence probability that a non-target object is present at a point in real space, calculating a posterior probability of the presence of a target object and the posterior probability of the absence of a target object for each point in real space from a score determined for each combination of the image acquisition section of the plurality of image acquisition sections and a point in real space, a score probability density function in the case a target object is present at a point, and a score probability density function in the case a target object is not present at a point, and creating position estimation information by using the posterior probability of the presence of a target object and the posterior probability of the absence of a target object.

20. The information creation method of estimating object position according to claim 19, wherein comparing the posterior probability of the presence of a target object and the posterior probability of the absence of a target object for each point in real space, a prescribed value meaning that an object is present is defined for object information indicating a result of a determination of the presence or absence of a target object at a point in real space when the condition is satisfied that the posterior probability of the presence of a target object is larger, or a value of 0 is defined for the object information when the condition is not satisfied, and creating position estimation information by specifying a region occupied by the target object in the case the target object is present at that point for each point in a prescribed plane in real space and adding the object information of each point in that region.

21. The information creation method of estimating object position according to claim 14, wherein the status of view to the point in real space from each of the plurality of image acquisition sections is determined by using, as non-target object presence information, information of a three-dimensional region occupied by a non-target object in real space.

22. The information creation method of estimating object position according to claim 21, wherein when determining the status of view, a point in real space is converted to two-dimensional coordinates corresponding to an image acquisition section of the plurality of image acquisition sections, the status of view to the point in real space from the image acquisition section of the plurality of image acquisition sections is determined to not be satisfactory in the case the converted coordinates are outside the range of an object region image corresponding to the image acquisition section of the plurality of image acquisition sections, the status of view to the point in real space from the image acquisition section of the plurality of image acquisition sections is determined to be satisfactory in the case the converted coordinates are within the range of an object region image corresponding to the image acquisition section of the plurality of image acquisition sections and a non-target object is not present between the image acquisition section of the plurality of image acquisition sections and the point in real space, and the status of view to the point in real space from the image acquisition section of the plurality of image acquisition sections is determined to not be satisfactory in the case the converted coordinates are within the range of an object region image corresponding to the image acquisition section of the plurality of image acquisition sections and a non-target object is present between the image acquisition section of the plurality of image acquisition sections and the point in real space.

23. The information creation method of estimating object position according to claim 22, wherein an object region image is created in which pixel values in a range of 0 to 1 are defined for each pixel, a score in a range of 0 to 1 is determined by referencing the object region image, a probability density function in which the function value increases as the score approaches 1 is determined as a score probability density function in the case a point is a target object with respect to a combination of the image acquisition section of the plurality of image acquisition sections and a point in real space in the case the status of view to the point in real space from the image acquisition section of the plurality of image acquisition sections has been determined to be satisfactory, a probability density function in which the function value increases as the score approaches 0 is determined as a score probability density function in the case the point is not a target object, and a function having a uniform distribution is determined as a score probability density function in the case the point is a target object and in the case in which the point is not a target object in the case the status of view to the point in real space from the image acquisition section of the plurality of image acquisition sections has been determined to not be satisfactory.

24. The information creation method of estimating object position according to claim 14, wherein
calculating the probability of an object being present at a pixel of an image acquired by the image acquisition section of the plurality of image acquisition sections in a range of 0 to 1, and an object region image is created by defining as the value of that probability the pixel value of each pixel of an object region image corresponding to each pixel of the image acquired by the image acquisition section of the plurality of image acquisition sections.

25. The information creation method of estimating object position according to claim 14, wherein
defining a point in real space is converted to two-dimensional coordinates corresponding to the image acquisition section of the plurality of image acquisition sections, a pixel value of a pixel of an object region image indicated by the converted coordinates as a score for a combination of the point in real space and the image acquisition section of the plurality of image acquisition sections in the case the converted coordinates are within the range of an object region image, and a fixed value indicating that a point in real space is outside view of the image acquisition section of the plurality of image acquisition sections is defined as a score for a combination of the point in real space and the image acquisition section of the plurality of image acquisition sections in the case the converted coordinates are outside the range of an object region image.

26. The information creation method of estimating object position according to claim 14, wherein the position at which a target object is present in a prescribed plane in real space is estimated using position estimation information created for each point in the prescribed plane.

27. A non-transitory computer readable medium comprising an information creation program for estimating object position causing a computer to execute:
an object region image creation processing for creating an object region image that indicates a region representing a target object in an image from each image respectively acquired by a plurality of image acquisition sections;
a score determination processing for determining a score, which indicates how accurately points in real space in each of the images respectively acquired by the plurality of image acquisition sections represent a target object targeted for position estimation, by referencing the object region image for each combination of an image acquisition section of the plurality of image acquisition sections and points in real space;
a view status determination processing for determining a status of view to each point in real space from each image acquisition section of the plurality of image acquisition sections by using non-target object presence information indicating to each of the image acquisition section of the plurality of image acquisition sections where a non-target object that conceals the target object is present, and determining a probability density function of a score in the case of points being a target object and the case of not being a target object for each combination of an image acquisition section of the plurality of image acquisition sections and points in real space corresponding to the result of a determined view status;
an existence probability calculation processing for determining an existence probability of the target object being present at each point in real space by integrating probability density functions corresponding to the result of determining the status of view to a point in real space from the image acquisition section of the plurality of image acquisition sections; and
an estimation information creation processing for creating position estimation information for each point in a prescribed plane in real space in order to estimate at what position in the prescribed plane a target object is present, based on the existence probability of a target object being present at each point in real space determined in the existence probability calculation processing.

28. The non-transitory computer readable medium according to claim 27, wherein the computer is caused, in the view status determination processing, to determine the status of view to each point in real space from each image acquisition section of the plurality of image acquisition sections by using as non-target object presence information a non-target object binary image, which is a binary image in which a pixel value of a region representing a non-target object in an image acquired by an image acquisition section of the plurality of image acquisition sections is defined to be a first pixel value and a pixel value of a region other than that region is defined to be a second pixel value.

29. The non-transitory computer readable medium according to claim 28, the computer is caused, in the view status determination processing,
to convert a point in real space is converted to two-dimensional coordinates corresponding to the image acquisition section of the plurality of image acquisition sections,
to determine the status of view to the point in real space from the image acquisition section of the plurality of image acquisition sections to not be satisfactory in the case the converted coordinates are outside the range of a non-target object binary image,
to determine the status of view to the point in real space from the image acquisition section of the plurality of image acquisition sections is to be satisfactory in the case the converted coordinates correspond to a region other than a non-target object within the range of the non-target object binary image,
to determine the status of view to the point in real space from the image acquisition section of the plurality of image acquisition sections to be satisfactory in the case the converted coordinates correspond to a region of a non-target object within the range of the non-target object binary image and a score for a combination of the image acquisition section of the plurality of image acquisition sections and the point in real space is equal to or greater than a threshold value, and
to determine the status view to the point in real space from the image acquisition section of the plurality of image acquisition sections to be unclear in the case the converted coordinates correspond to a region of a non-target object within the range of the non-target object binary image and a score for a combination of the image acquisition section of the plurality of image acquisition sections and the point in real space is less than a threshold value.

30. The non-transitory computer readable medium according to claim 29, wherein the computer is caused
to create an object region image in which pixel values in a range of 0 to 1 are defined for each pixel in the object region image creation processing,
to determine a score in a range of 0 to 1 by referencing the object region image in the score determination processing, and in the view status determination processing,
to determine a probability density function in which a function value increases as the score approaches 1 as a score probability density function in the case the point is a target object with respect to a combination of the image acquisition section of the plurality of image acquisition sections and the point in real space in the case the status of view to the point in real space from the image acquisition section of the plurality of image acquisition sections has been determined to be satisfactory and a probability density function is determined in which a function value increases as the score approaches 0 as a score probability density function in the case the point is not a target object, and
to determine a function having a uniform distribution as a score probability density function in the case the point is a target object and the case in which the point is not a target object in the case the status of view to the point in real space from the image acquisition section of the plurality of image acquisition sections has been determined to not be satisfactory or in the case the status of view has been determined to be unclear.

31. The non-transitory computer readable medium according to claim 28, wherein the computer is caused
to create an object region image in which pixel values in a range of 0 to 1 are defined for each pixel in the object region image creation processing,
to determine a score in a range of 0 to 1 by referencing the object region image in the score determination processing, and
in the view status determination processing,
to convert a point in real space to two-dimensional coordinates corresponding to the image acquisition section of the plurality of image acquisition sections,
to determine a function having a uniform distribution as a score probability density function in the case the point is a target object and in the case the point is not a target object with respect to a combination of the image acquisition section of the plurality of image acquisition sections and the point in real space in the case the converted coordinates are outside the range of a non-target object binary image,
to determine a probability density function, in which a function value increases as the score approaches 1, as a score probability density function in the case the point is a target object with respect to a combination of the image acquisition section of the plurality of image acquisition sections and the point in real space in the case the converted coordinates correspond to a region other than a non-target object within the range of the non-target object binary image, and to determine a probability density function, in which a function value increases as the score approaches 0, as a score probability density function in the case the point is not a target object,
to determine a probability density function, in which a range of variation of a function value is a range of variation corresponding to a score determined in the score determination processing and the function value increases as the score approaches 1, as a score probability density function in the case the point is a target object with respect to a combination of the image acquisition section of the plurality of image acquisition sections and the point in real space in the case the converted coordinates correspond to a region of a non-target object within the range of the non-target object binary image, and to determine a probability density function, in which a range of variation of a function value is a range of variation corresponding to a score determined in the score determination processing and the threshold value increases as the score approaches 0, as a score probability density function in the case the point is not a target object.

32. The non-transitory computer readable medium according to claim 31, wherein the computer is caused
to calculate a posterior probability of the presence of a target object and a posterior probability of the absence of a target object for each point in real space from a score determined for each combination of the image acquisition section of the plurality of image acquisition sections and a point in real space, a score probability density function in the case a target object is present at a point, and a score probability density function in the case a target object is not present at a point in the existence probability calculation processing, and
to create position estimation information in the estimation information creation processing by using the posterior probabilities calculated in the existence probability calculation processing.

33. The non-transitory computer readable medium according to claim 32, wherein the computer is caused, in the estimation information creation processing,
to compare the posterior probability of the presence of a target object with the posterior probability of the absence of a target object for each point in real space, and to define a prescribed value meaning that an object is present for object information indicating the result of a determination of the presence or absence of a target object at a point in real space when the condition is satisfied that the posterior probability of the presence of a target object is larger, or moreover to define a value of 0 for the object information when the condition is not satisfied, and
to create position estimation information by specifying a region occupied by the target object in the case the target object is present at a certain point for each point in a prescribed plane in real space and adding the object information of each point in that region.

34. The non-transitory computer readable medium according to claim 27, wherein the computer is caused to determine in the view status determination processing the status of view to each point in real space from each of the plurality of image acquisition sections by using information of a three-dimensional region occupied by a non-target object in real space as non-target object presence information.

35. The non-transitory computer readable medium according to claim 34, wherein the computer is caused, in the view status determination processing,
to convert a point in real space to two-dimensional coordinates corresponding to an image acquisition section of the plurality of image acquisition sections,
to determine the status of view to the point in real space from the image acquisition section of the plurality of image acquisition sections to not be satisfactory in the case the converted coordinates are outside the range of an object region image corresponding to the image acquisition section of the plurality of image acquisition sections,
to determine the status of view to the point in real space from the image acquisition section of the plurality of image acquisition sections to be satisfactory in the case the converted coordinates are within the range of an object region image corresponding to the image acquisition section of the plurality of image acquisition sections and a non-target object is not present between the image acquisition section of the plurality of image acquisition sections and the point in real space, and to determine the status of view to the point in real space from the image acquisition section of the plurality of image acquisition sections to not be satisfactory in the case the converted coordinates are within the range of an object region image corresponding to the image acquisition section of the plurality of image acquisition sections and a non-target object is present between the image acquisition section of the plurality of image acquisition sections and the point in real space.

36. The non-transitory computer readable medium according to claim 35, wherein the computer is caused to create an object region image in which pixel values in a range of 0 to 1 are defined for each pixel in the object region image creation processing, to determine a score in a range of 0 to 1 by referencing the object region image in the score determination processing, and in the view status determination processing, to determine a probability density function, in which a function value increases as the score approaches 1, as a score probability density function in the case a point is a target object with respect to a combination of the image acquisition section of the plurality of image acquisition sections and a point in real space in the case the status of view to the point in real space from the image acquisition section of the plurality of image acquisition sections has been determined to be satisfactory, and to determine a probability density function, in which a function value increases as the score approaches 0, as a score probability density function in the case the point is not a target object, and to determine a function having a uniform distribution as a score probability density function in the case the point is a target object and the case in which the point is not a target object in the case the status of view to the point in real space from the image acquisition section of the plurality of image acquisition sections has been determined to not be satisfactory.

37. The non-transitory computer readable medium according to claim 27, wherein the computer is caused to calculate the probability of an object being present at a pixel of an image acquired by an image acquisition section of the plurality of image acquisition sections in a range of 0 to 1, and to create an object region image by defining the pixel value of each pixel of an object region image corresponding to each pixel of the image acquired by the image acquisition section of the plurality of image acquisition sections as the value of that probability in the object region image creation processing.

38. The non-transitory computer readable medium according to claim 27, wherein the computer is caused to convert a point in real space to two-dimensional coordinates corresponding to the image acquisition section of the plurality of image acquisition sections, and to define a pixel value of a pixel of an object region image indicated by the converted coordinates as a score for a combination of the point in real space and the image acquisition section of the plurality of image acquisition sections in the case the converted coordinates are within the range of an object region image, and to define a fixed value indicating that a point in real space is outside the field of an image acquisition section of the plurality of image acquisition sections as a score for a combination of the point in real space and the image acquisition section of the plurality of image acquisition sections in the case the converted coordinates are outside the range of an object region image in the score determination processing.

39. The non-transitory computer readable medium according to claim 27, wherein the computer is caused to execute position estimation processing in which the position at which a target object is present in a prescribed plane in real space is estimated using position estimation information created for each point in the prescribed plane.

* * * * *